US009317234B2

(12) United States Patent
Watanabe et al.

(10) Patent No.: US 9,317,234 B2
(45) Date of Patent: Apr. 19, 2016

(54) COMPUTER READABLE INFORMATION RECORDING MEDIUM STORING PREVIEW DISPLAY PROGRAM, PREVIEW DISPLAY APPARATUS AND PREVIEW DISPLAY METHOD

(75) Inventors: Mie Watanabe, Tokyo (JP); Hiroyuki Nishiyama, Tokyo (JP); Yoshikazu Tanaka, Tokyo (JP); Kazuya Kurihara, Tokyo (JP); Seiji Tokuoka, Tokyo (JP); Shi Zhong Zhu, Tokyo (JP)

(73) Assignee: Ricoh Company, LTD., Tokyo (JP)

( * ) Notice: Subject to any disclaimer, the term of this patent is extended or adjusted under 35 U.S.C. 154(b) by 1122 days.

(21) Appl. No.: 13/358,031

(22) Filed: Jan. 25, 2012

(65) Prior Publication Data

US 2012/0195715 A1    Aug. 2, 2012

(30) Foreign Application Priority Data

Feb. 1, 2011   (JP) ................................. 2011-020220
Jan. 10, 2012  (JP) ................................. 2012-002572

(51) Int. Cl.
*G06F 15/00*    (2006.01)
*G06K 1/00*     (2006.01)
*G06F 3/12*     (2006.01)
*G06K 15/00*    (2006.01)
(Continued)

(52) U.S. Cl.
CPC ............ *G06F 3/1256* (2013.01); *G06F 3/1208* (2013.01); *G06F 3/1252* (2013.01); *G06F 3/1282* (2013.01); *G06F 3/1288* (2013.01); *G06F 3/1246* (2013.01)

(58) Field of Classification Search
CPC .. G06F 17/212; G06F 3/0483; H04N 1/00456; H04N 1/00466
USPC ......... 358/1.6, 1.13, 1.15, 1.18, 1.9; 715/274, 715/273, 277, 900, 901, 200, 204, 251; 345/633, 156; 399/81, 82; 412/1, 11
See application file for complete search history.

(56) References Cited

U.S. PATENT DOCUMENTS 6,616,702 B1 *   9/2003  Tonkin .................. G06F 17/212
                                                        715/209
6,999,198 B1     2/2006  Nakagiri et al.
(Continued)

FOREIGN PATENT DOCUMENTS

JP    2001-136364 A    5/2001
JP    2006-140756 A    6/2006
(Continued)

*Primary Examiner* — Mohammad Ghayour
*Assistant Examiner* — Jonathan R Beckley
(74) *Attorney, Agent, or Firm* — Harness, Dickey & Pierce, P.L.C.

(57) ABSTRACT

A computer readable information recording medium stores a preview display program that performs, when executed by one or more processors, functions of a part configured to determine setting information for imposition type; a part configured to determine setting information for finishing; and a part configured to display preview images for a state after bookbinding in a case where the setting information for imposition type, determined by the part configured to determine setting information for imposition type, includes a setting of magazine or mini book and the setting information for finishing, determined by the part configured to determine setting information for finishing, includes a setting for carrying out the bookbinding, and display preview images for a state before the bookbinding in the other cases.

18 Claims, 25 Drawing Sheets

(51) Int. Cl.
*G06F 17/00* (2006.01)
*G06F 3/048* (2013.01)

(56) References Cited

U.S. PATENT DOCUMENTS

| | | | |
|---|---|---|---|
| 7,290,285 B2 * | 10/2007 | McCurdy | G06F 17/30011 380/200 |
| 8,068,251 B2 * | 11/2011 | Sakuramata | G06F 3/0483 358/1.17 |
| 8,115,968 B2 * | 2/2012 | Mano | H04N 1/40 358/448 |
| 2005/0275879 A1 * | 12/2005 | Ogasawara | H04L 29/06027 358/1.15 |
| 2008/0225346 A1 | 9/2008 | Mano et al. | |
| 2010/0188679 A1 * | 7/2010 | Nakagawa | H04N 1/0035 358/1.12 |

FOREIGN PATENT DOCUMENTS

| | | |
|---|---|---|
| JP | 2006-209398 A | 8/2006 |
| JP | 2008226050 A | 9/2008 |
| JP | 2010-176709 A | 8/2010 |

\* cited by examiner

12 PAGES

IMPOSITION: MAGAZINE

FINISHING: STAPLING CENTER TWO POSITIONS

12 PAGES

IMPOSITION: MINI BOOK

FINISHING: HALF FOLD

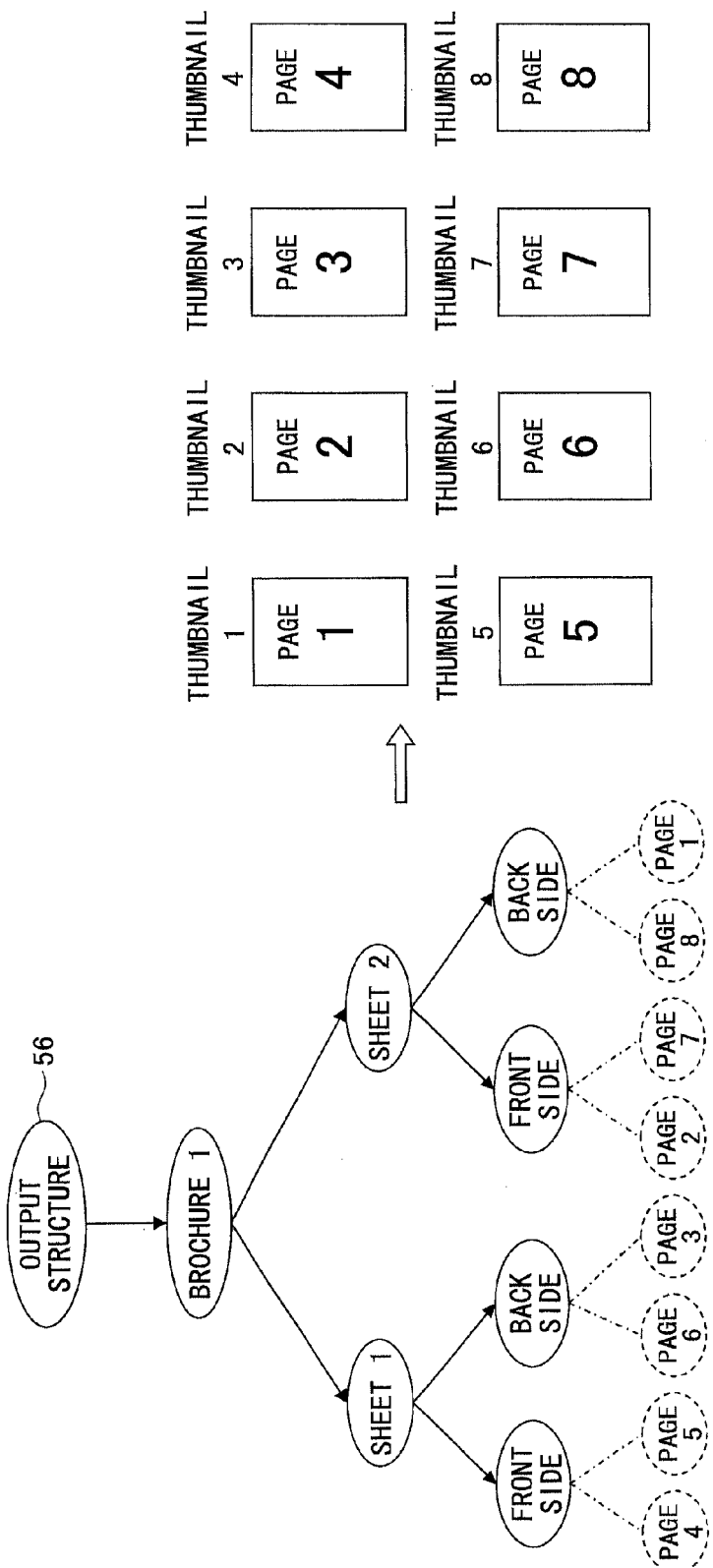

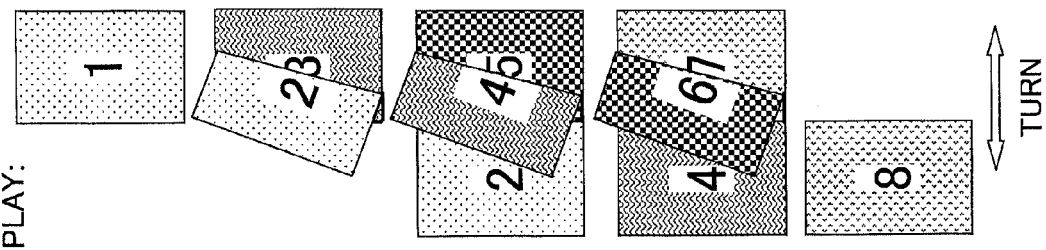
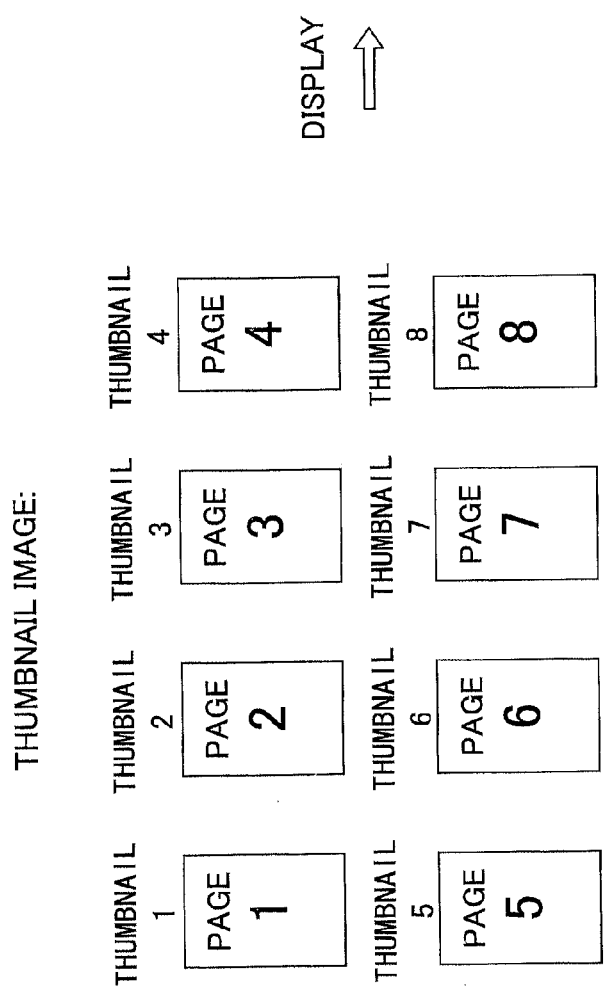

COMPUTER READABLE INFORMATION RECORDING MEDIUM STORING PREVIEW DISPLAY PROGRAM, PREVIEW DISPLAY APPARATUS AND PREVIEW DISPLAY METHOD

BACKGROUND OF THE INVENTION

1. Field of the Invention

The present invention relates to a computer readable information recording medium storing a preview display program, a preview display apparatus and a preview display method, for displaying a preview image.

2. Description of the Related Art

A company in the commercial printing industry, which receives printed pages (a catalog, an advertisement or the like) from a customer, generates printed output pages requested by the customer from the printed pages, delivers the thus generated printed output pages to the customer and receives a reward from the customer, carries out plural processes from the reception of the printed pages to the delivery of the printed output pages. The plural processes from the reception of the printed pages to the delivery of the printed output pages include, for example, a reception of printed pages from the customer, a reception of printing conditions for the printed output pages from the customer, a prepress process such as a color change, a layout change and a binding position change, proof printing for the customer to check the prepress result, a printing process, a post-press process (post process) such as binding the printed output pages, compression bonding of the printed output pages or the like after the printing process, and delivery of the printed output pages to the customer. It is noted that the plural processes from the reception of the printed pages to the delivery of the printed output pages may increase or decrease depending on the printing conditions for the printed output pages requested by the customer.

In the related art of the commercial printing industry, there are many orders from customers to carry out printing in large quantities, and the above-mentioned plural processes from the reception of the printed pages to the delivery of the printed output pages, for example, are carried out to execute the many orders. Further, in many cases, for such orders of printing in large quantities, printing conditions from customers for printed output pages are fixed. Therefore, in the commercial printing industry in the related art, printed output pages requested by customers are generated through cycles in which a large quantity (lot) of printing is carried out according to fixed printing conditions, and after the printing for the lot is finished, another lot of printing is carried out after the printing conditions are changed.

In the printing cycles, the above-mentioned plural processes from the reception of the printed pages to the delivery of the printed output pages are carried out in many cases when printing conditions from customers for printed output pages are changed. Therefore, in a case where printing conditions from customers for printed output pages are not changed, a commercial printer can carry out printing continuously according to the fixed printing conditions, and thus, it is possible to carry out printing in large quantities with high efficiency.

Recently, a print on demand (POD) market has appeared in which a commercial printer delivers a relatively small lot of printed output pages to a customer with a short delivery time. In the POD market, orders from plural customers are received in many cases. As a result, in the POD market, in many cases, printed pages sent to a commercial printer from customers include many different types of printed pages, or printing conditions requested by the customers for printed output pages include many different conditions.

Furthermore, recently, digitizing of printed pages has proceeded, and a computer has been used to control generation of printed output pages. For example, workflow techniques of sending printed pages from a customer in a form of electronic data to a printer via a communication network and/or controlling the above-mentioned plural processes from reception of printed pages to delivery of printed output pages have appeared. For example, according to the workflow techniques, there is a configuration in which printing operations in the above-mentioned plural processes from reception of printed pages to delivery of printed output pages are defined by a job ticket using a job definition format (JDF), and the printing operations are controlled in a printing system.

Along with such a change in the printing environment, commercial printers have proceeded with introduction of computers into printing systems for generating printed output pages for received orders. On the other hand, commercial printers currently need to build printing systems which can meet various printing conditions for printed output pages requested by customers and so forth. Further, in order to generate various printed output pages requested by customers, it becomes necessary to meet customers' requests, from a system viewpoint by introducing plural printer apparatuses and/or peripheral apparatuses (i.e., device apparatuses), and from a working process viewpoint by changing the above-mentioned plural processes from reception of printed pages to delivery of printed output pages at relatively short cycles.

Commercial printers thus need to meet customers' requests in the above-mentioned manner, and also, need to improve the operational efficiency in order to produce profits. As a method to improve the operational efficiency, there is a method of simplifying operations.

For example, useless consumptions of sheets of paper and/or toner may occur because of erroneous printing settings or miscopy. In consideration thereof, it is effective, for avoiding waste, to check how printed output pages will be obtained, before actually printing the printed output pages. As a method of checking how printed output pages can be obtained, before actually printing the printed output pages, a method of displaying preview images of printed output pages is known.

Further, also a method of displaying preview images in an order of pages to be obtained after bookbinding is known (for example, see Japanese Laid-Open Patent Application No. 2001-136364).

SUMMARY OF THE INVENTION

According to an aspect of the present invention, a computer readable information recording medium stores a preview display program. The preview display program performs, when executed by one or more processors, functions of a part configured to determine setting information for imposition type; a part configured to determine setting information for finishing; and a part configured to display preview images for a state after bookbinding in a case where the setting information for imposition type includes a setting of magazine or mini book and the setting information for finishing includes a setting for carrying out bookbinding, and display preview images for a state before bookbinding in the other cases.

Other objects, features and advantages of the present invention will become more apparent from the following detailed description when read in conjunction with the accompanying drawings.

BRIEF DESCRIPTION OF THE DRAWINGS

FIGS. 24A and 24B show an image of processing of step S12 of FIG. 21; and

FIGS. 25A and 25B show an image of processing in step S13 of FIG. 21.

DETAILED DESCRIPTION OF THE PREFERRED EMBODIMENTS

Figure 1:
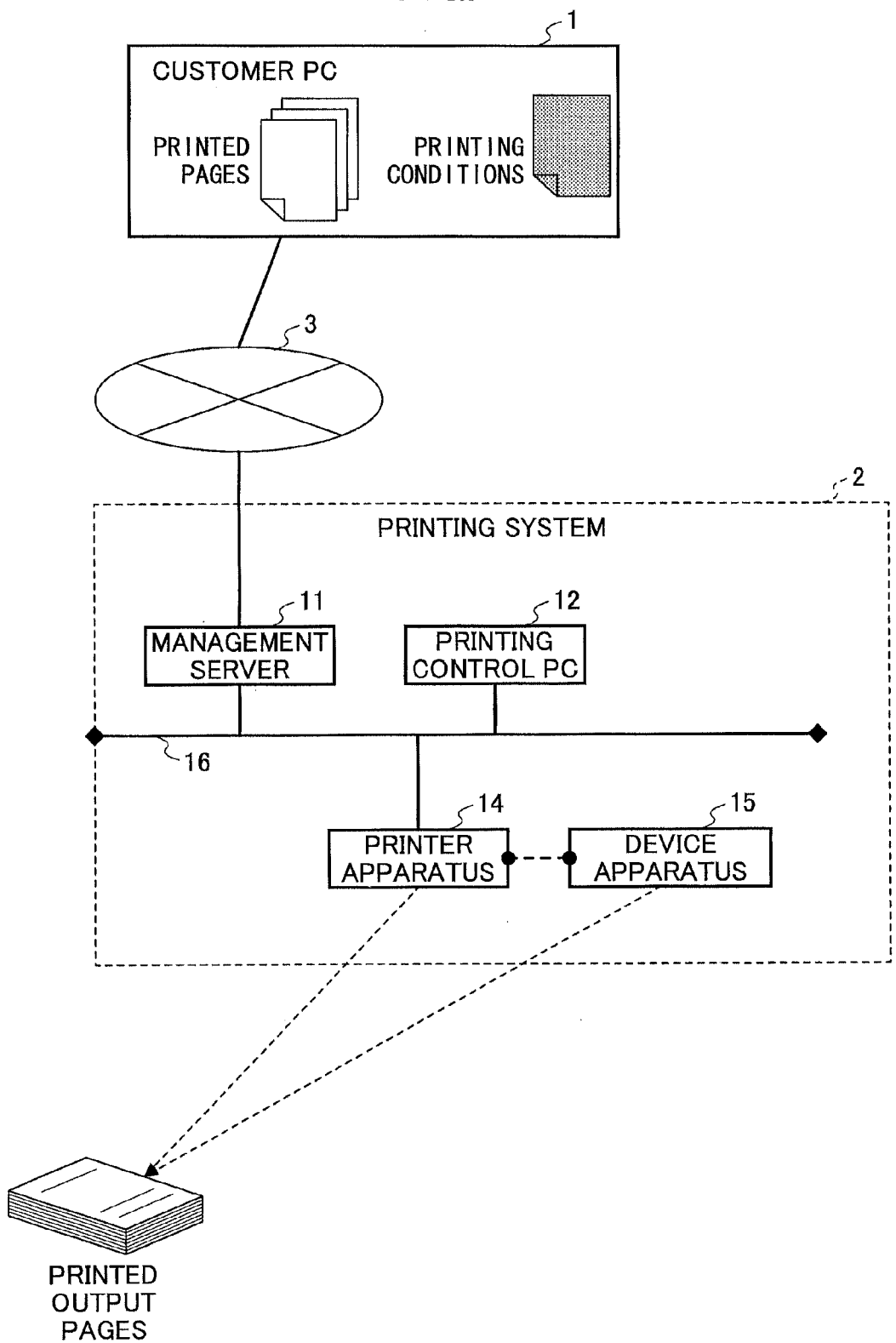
FIG. 1 is a system configuration diagram showing one example of a printing system according to an embodiment of the present invention.

As mentioned above, the method of displaying preview images in an order of pages to be obtained after bookbinding is known (for example, see Japanese Laid-Open Patent Application No. 2001-136364).

However, in a case of checking how printed output pages will be obtained, before actually printing the printed output pages and carrying out bookbinding, a commercial printer checks the expected result, not necessarily using only an order of pages obtained after bookbinding. For example, the commercial printer may check the expected result, using an order of pages printed on sheets of paper during carrying out the print job. It is noted that an order of pages printed on sheets of paper is determined according to "imposition". "Imposition" means arranging pages on sheets of paper in such a manner as the respective pages being arranged after bookbinding according to a predetermined order.

Thus, in many cases in the related art, preview images displayed in a case of printing accompanying bookbinding are those automatically displayed using a page order after bookbinding, and thus, convenience for the operator may be not satisfactory. It is noted that according to the related art, in order to obtain preview images in an order of pages printed on sheets of paper before bookbinding, a commercial printer may need to carry out operations to manually switch the preview images, and thus, convenience for the operator may be not satisfactory.

An embodiment of the present invention has been devised in consideration of the above-mentioned point, and an object of the embodiment of the present invention is to provide a computer readable information recording medium storing a preview display program, a preview display apparatus and a preview display method, by which it is possible to automatically switch between displaying preview images of printed output pages before bookbinding and displaying preview images of printed output pages after bookbinding.

According to the embodiment of the present invention, a computer readable information recording medium stores a preview display program. The preview display program performs, when executed by one or more processors, functions of a part configured to determine setting information for imposition type; a part configured to determine setting information for finishing; and a part configured to display preview images for a state after bookbinding in a case where the setting information for imposition type includes a setting of magazine or mini book and the setting information for finishing includes a setting for carrying out bookbinding, and display preview images for a state before bookbinding in the other cases.

It is noted that a method, an apparatus, a system, a computer program, a computer readable information recording medium, a data structure, or the like, to which elements or expressions of the embodiment of the present invention or any combinations of the elements are applied, are also effective as embodiments of the present invention.

According to the embodiments of the present invention, it is possible to automatically switch between displaying preview images of printed output pages before bookbinding and displaying preview images of printed output pages after bookbinding.

Next, an embodiment of the present invention will be described with reference to the figures.

<System Configuration>

FIG. 1 is a system configuration diagram showing one example of a printing system according to an embodiment of the present invention. In the system shown in FIG. 1, a customer PC 1 and a printing system 2 are connected using a network 3 such as the Internet. The customer PC 1 is an apparatus used by a customer. The printing system 2 is a system used by an operator of a commercial printer or the like.

Further, the printing system 2 includes a management server 11, a printing control PC 12, a printer apparatus 14, a device apparatus 15, and a network 16 such as a local area network (LAN). The management server 11, the printing control PC 12 and the printer apparatus 14 are connected using the network 16.

The management server 11 is an apparatus that manages data sent from the customer. The printing control PC 12 is an apparatus that carries out printing control. The printer apparatus 14 is an apparatus that prints printed output pages. The device apparatus 15 is an apparatus used in printing processing and post process processing, and is connected to the printer apparatus 14.

The customer operates the customer PC 1, and transmits, via the network 3, printing data of printed pages and printing conditions to the management server 11 as the data sent from the customer. The management server 11 manages the data sent from the customer received from the customer PC 1. The operator who uses the printing system 2 to generate the printed output pages accesses the management server 11 from the printing control PC 12 to obtain the data sent from the customer, and generates the printed output pages through the printing control as will be described later. Further, the printing control PC 12 obtains a status of the printer apparatus 14. The status of the printer apparatus 14 includes, for example, a state in which the printer apparatus 14 can carry out printing or a state in which the printer apparatus 14 cannot carry out printing, a state of the device apparatus 15 connected to the printer apparatus 14, and so forth.

<Hardware Configuration>

Figure 2:
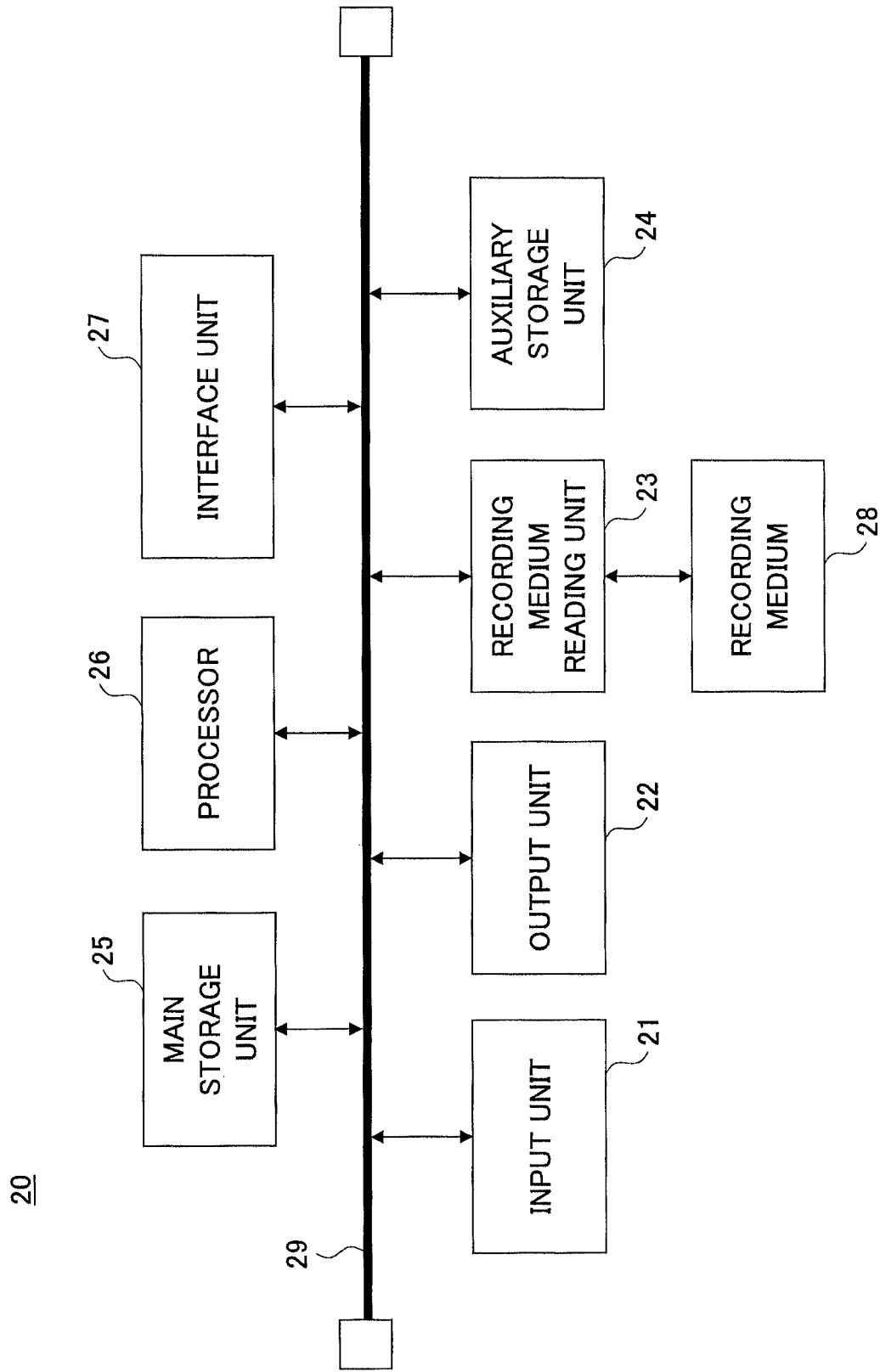
FIG. 2 is a hardware configuration diagram showing one example of a personal computer (PC)

The printing control PC 12 is realized by a PC having a hardware configuration shown in FIG. 2, for example. FIG. 2 is a hardware configuration diagram showing one example of a PC 20. The PC 20 shown in FIG. 2 includes an input unit 21, an output unit 22, a recording medium reading unit 23, an auxiliary (secondary) storage unit 24, a main storage unit (memory) 25, a processor 26 and an interface unit 27, which are mutually connected using a bus 29.

The input unit 21 includes, for example, a keyboard, a mouse and so forth. The input unit 21 is used for inputting various signals. The output unit 22 includes, for example, a display unit or the like. The output unit 22 is used to display various windows (screen pages), various data, or the like. The interface unit 27 includes, for example, a modem, a LAN card, and so forth. The interface unit 27 is used for connecting with the network 16.

A printing control program(s) (which may be simply referred to as a program, hereinafter) loaded in the printing control PC 12 is(are), at least, one or more of various programs that control the PC 20. The program is provided through, for example, delivery of a recording medium 28, downloading from the network 16, or such.

As the recording medium 28, any one of various types of recording media such as recording media, storing information optically, electrically, or magnetically, such as a CD-ROM, a flexible disk, a magneto-optical disk and so forth, and semiconductor memories, storing information electrically, such as a ROM, a flash memory and so forth, can be used.

When the recording medium 28 storing the program is set in the recording medium reading unit 23, the program is installed in the auxiliary storage unit 24 via the recording medium reading unit 23. The program downloaded from the network 16 or the like is installed in the auxiliary storage unit 24 via the interface unit 27.

The auxiliary storage unit 24 stores the installed program, necessary files, data, and so forth. The main storage unit 25 reads the program from the auxiliary storage unit 24, and stores it, when starting up the program. Then, the processor 26 realizes various sorts of processing described later according to the program stored in the main storage unit 25.

<Software Configuration>

Figure 3:
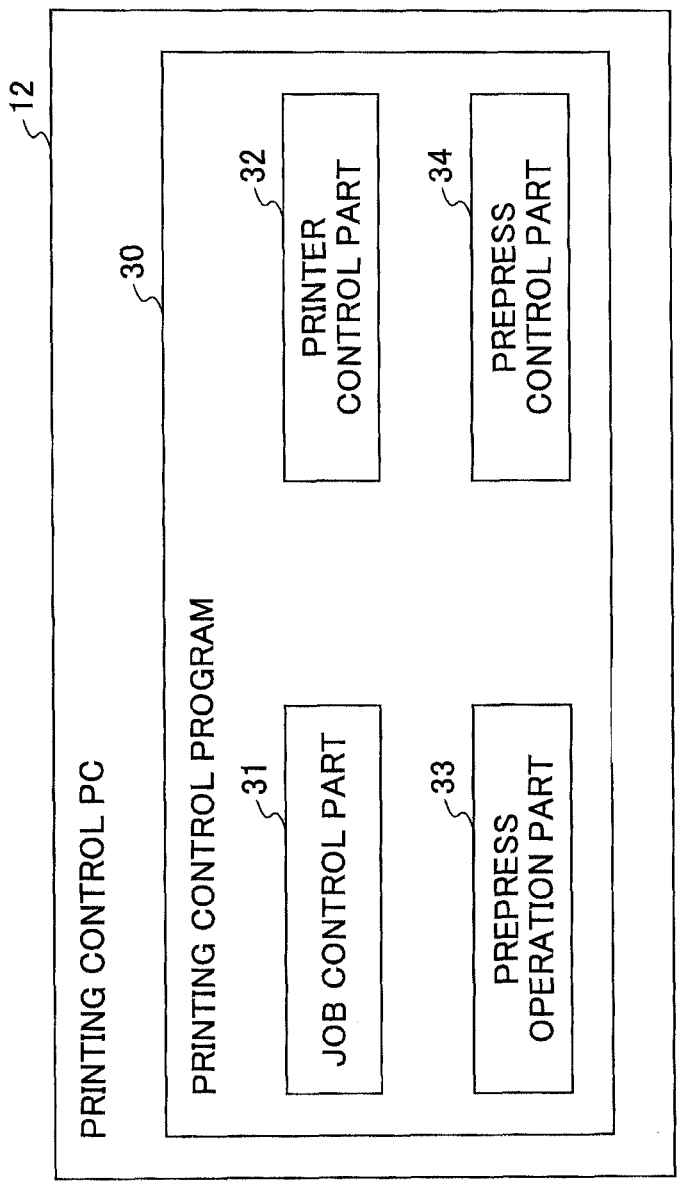
FIG. 3 is a processing block diagram showing one example a printing control PC shown in FIG. 1.

In a case of the system shown in FIG. 1, the printing control PC 12 is realized by, for example, processing blocks shown in FIG. 3. FIG. 3 is a processing block diagram showing one example the printing control PC 12. In the printing control PC 12, the printing control program 30 is loaded. The printing control PC 12 executes the printing control program 30 to realize a job control part 31, a printer control part 32, a prepress operation part 33 and a prepress control part 34.

The job control part 31 generates a job (job data) obtained from converting the data sent from the customer into a data form in which the data sent from the customer can be used for printing carried out by the printer apparatus 14. The job control part 31 converts the data sent from the customer to the data form in which the data sent from the customer can be used for printing carried out by the printer apparatus 14, i.e., a PostScript (PS) form that is common, as one example. The printer control part 32 obtains a status of the printer apparatus 14, and transmits the obtained status to the job control part 31. The printer control part 32 controls processing carried out by the printer apparatus 14 according to the job data.

The prepress operation part 33 receives printing settings from the operator. The received printing settings are processed by the prepress control part 34. The prepress control part 34 carries out communications with the prepress operation part 33, and processes printing setting information such as the printing settings input from the prepress operation part 33.

As one example, in a case where an imposition setting has been carried out as a printing setting by the prepress operation part 33, the prepress control part 34 processes the imposition setting information. By processing the imposition setting information, the prepress control part 34 creates a JDF for carrying out printing by using the job data according to the imposition setting information. The prepress control part 34 stores the imposition setting information in the created JDF.

Further, in a case where a post process setting has been carried out as a printing setting by the prepress operation part 33, the prepress control part 34 processes the post process setting information. By processing the post process setting information, the prepress control part 34 creates a JDF for carrying a post process according to the post process setting information. The prepress control part 34 stores the post process setting information in the created JDF.

Further, in a case where a tab sheet printing setting has been carried out as a printing setting by the prepress operation part 33, the prepress control part 34 processes the tab sheet printing setting information. By processing the tab sheet printing setting information, the prepress control part 34 creates a JDF for inserting a tab sheet between pages according to the tab sheet printing setting information. The prepress control part 34 stores the tab sheet printing setting information in the created JDF.

Further, the prepress operation part 33 receives a preview display request from the operator. The received preview display request is processed by the prepress control part 34. The prepress control part 34 carries out communications with the prepress operation part 33, and processes the preview display request that is input from the prepress operation part 33.

<Flow of Processing>

Below, a flow of processing will be described for when the operator carries out the imposition setting and the post process setting, and after that, carries out the preview display request, in the configuration of the processing blocks shown in FIG. 3.

<<Imposition Type Selection Screen Page>>

Figure 4A:
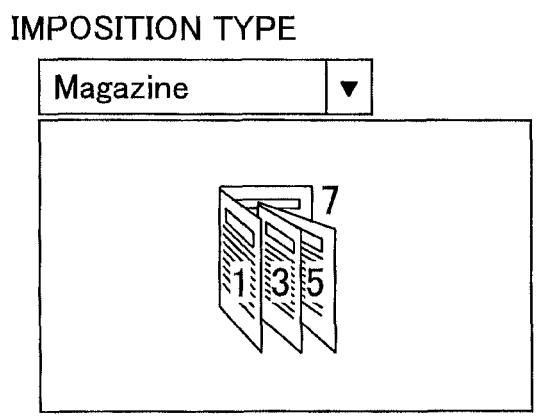
FIGS. 4A and 4B show images of one example of an imposition type selection screen page.
Figure 4B:
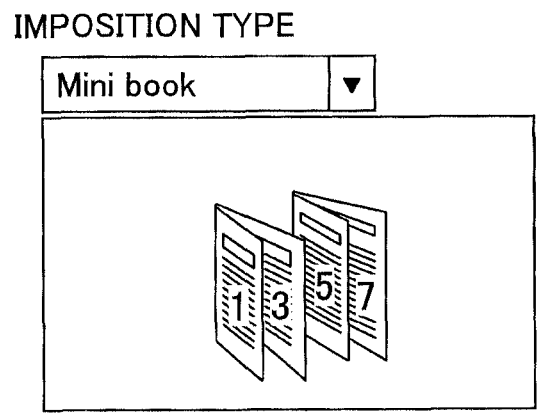

The prepress operation part 33 submits, to the operator, an imposition type selection screen page such as that shown in FIGS. 4A and 4B, and the operator selects an imposition type using the imposition type selection screen page.

FIGS. 4A and 4B show images of one example of the imposition type selection screen page. The imposition type selection screen page of FIGS. 4A and 4B is an example for selecting the imposition type using a pull-down menu. For example, FIG. 4A shows one example of the imposition type selection screen page for when "magazine" (which means a weekly magazine, for example) has been selected as the imposition type. FIG. 4B shows one example of the imposition type selection screen page for when "mini book" has been selected as the imposition type.

As shown in FIG. 4A, "magazine" of the imposition type means a type of imposition to be used for a type of bookbinding in which after respective page images are printed on front and back sides of plural sheets of paper, the plural sheets of paper are superposed together, and after that, the plural sheets of paper are folded (in a half fold manner) in a lump while the superposed state is kept, to form a book having a form of a weekly magazine or the like.

In contrast thereto, as shown in FIG. 4B, "mini book" of the imposition type means a type of imposition to be used for another type of bookbinding in which after respective page images are printed on front and back sides of plural sheets of paper, the plural sheets of paper are folded (in a half fold manner) separately, and after that, the plural sheets of paper, each of which has been thus folded separately, are superposed together while the folded states of the respective plural sheets of paper are kept, to form a book having a form of a mini book.

Figure 5:
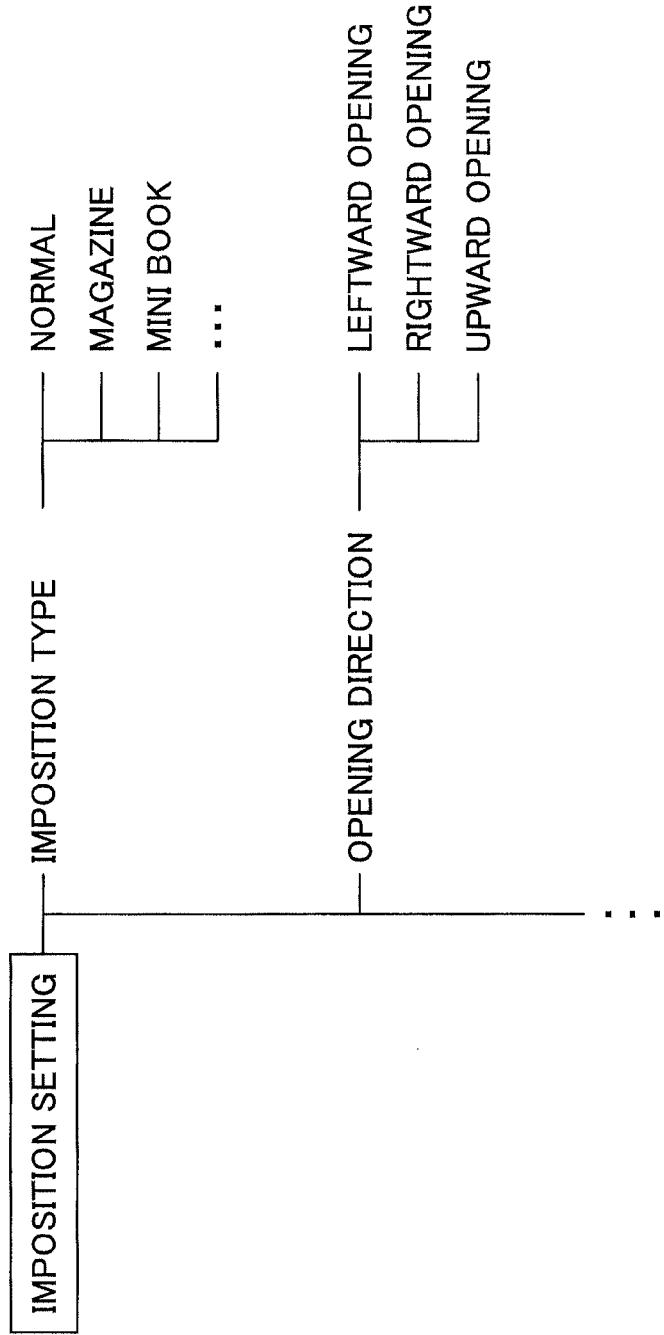
FIG. 5 is a configuration of one example of data concerning an imposition setting.

In the example of the imposition type selection screen page of FIGS. 4A and 4B, when the imposition type has been selected by the operator, an image for the selected type is displayed. FIG. 4A displays an image of printed output pages for when the imposition type is magazine. FIG. 4B displays an image of printed output pages for when the imposition type is mini book. It is noted that the imposition setting carried out by the operator may be such as any one of those shown in FIG. 5. FIG. 5 is a configuration of one example of data concerning the imposition setting. The data concerning imposition setting shown in FIG. 5 includes the imposition setting and an opening direction. According to the data concerning imposition setting shown in FIG. 5, the imposition setting may be any one of normal, magazine and mini book. The opening direction may be any one of leftward opening, rightward opening, upward direction and so forth.

<<Post Process Setting Screen Page>>

Figure 6:
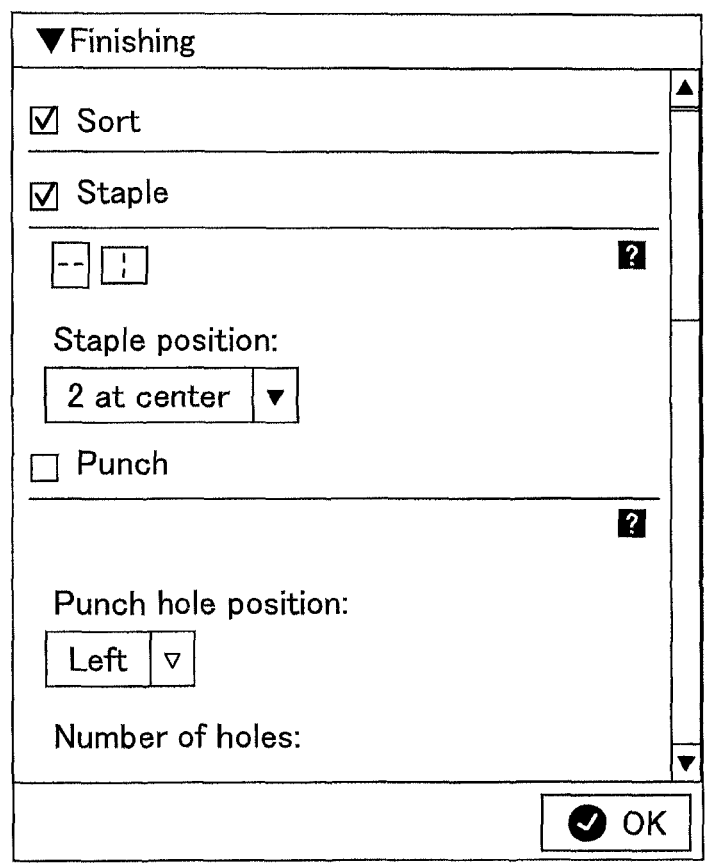
FIG. 6 shows an image of one example of a part for a stapling setting in a post process setting screen page.
Figure 7:
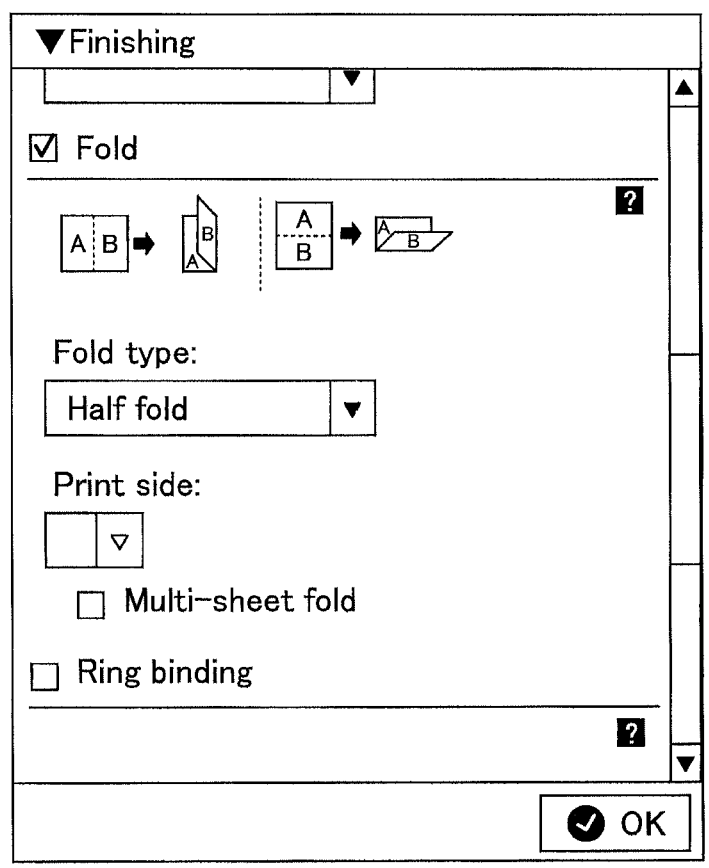
FIG. 7 shows an image of one example of a part for a folding setting in a post process setting screen page.

The prepress operation part 34 submits, to the operator, a post process setting screen page such as that shown in FIGS. 6 and 7, for example, and the operator carries out the post process setting using the post process setting screen page. FIG. 6 shows an image of one example of a part for a stapling setting in the post process setting screen page. The part for stapling setting of FIG. 6 is one example for when stapling at two positions at the center (i.e., "center two positions", in other words, saddle stitching) has been set. FIG. 7 shows an image of one example of a part for a folding setting in the post process setting screen page. The part for folding setting of FIG. 7 is one example for when "half fold" has been set. The parts of the post process setting screen page shown in FIGS. 6 and 7 show an example in which by scrolling, the part for the stapling setting and the part for the folding setting are displayed.

Figure 8:
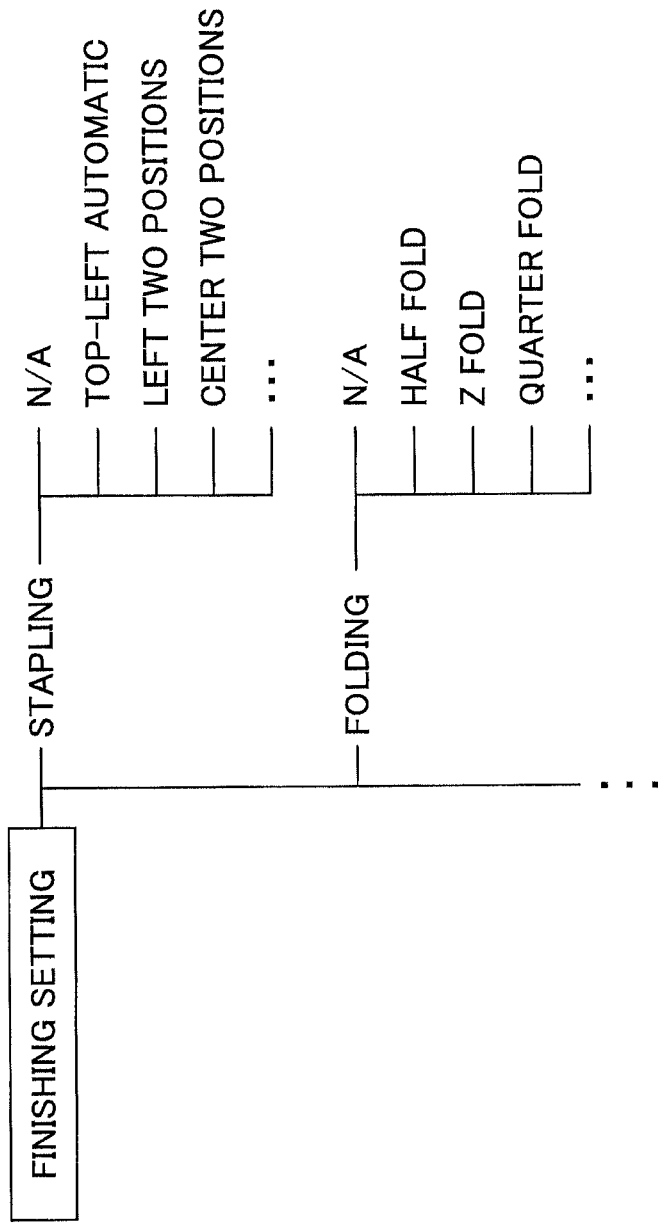
FIG. 8 is a configuration of one example of data concerning a finishing setting.

It is noted that the post process setting carried out by the operator includes those shown in FIG. 8. FIG. 8 is a configuration of one example of data concerning a finishing setting. The data concerning the finishing setting (i.e., the post process setting) of FIG. 8 includes stapling and folding. The stapling includes "not applicable" (N/A), "top-left automatic", "left two positions" and "center two positions" (stapling being carried out at two positions at the center). The folding includes "N/A", "half fold", "z fold" and "quarter fold".

<<Preview Display Processing>>

The prepress operation part 33 receives the preview display request from the operator. When the prepress operation part 33 has received the preview display request from the operator, the prepress control part 34 displays preview images according to a procedure shown in a flowchart of FIG. 9.

Figure 9:
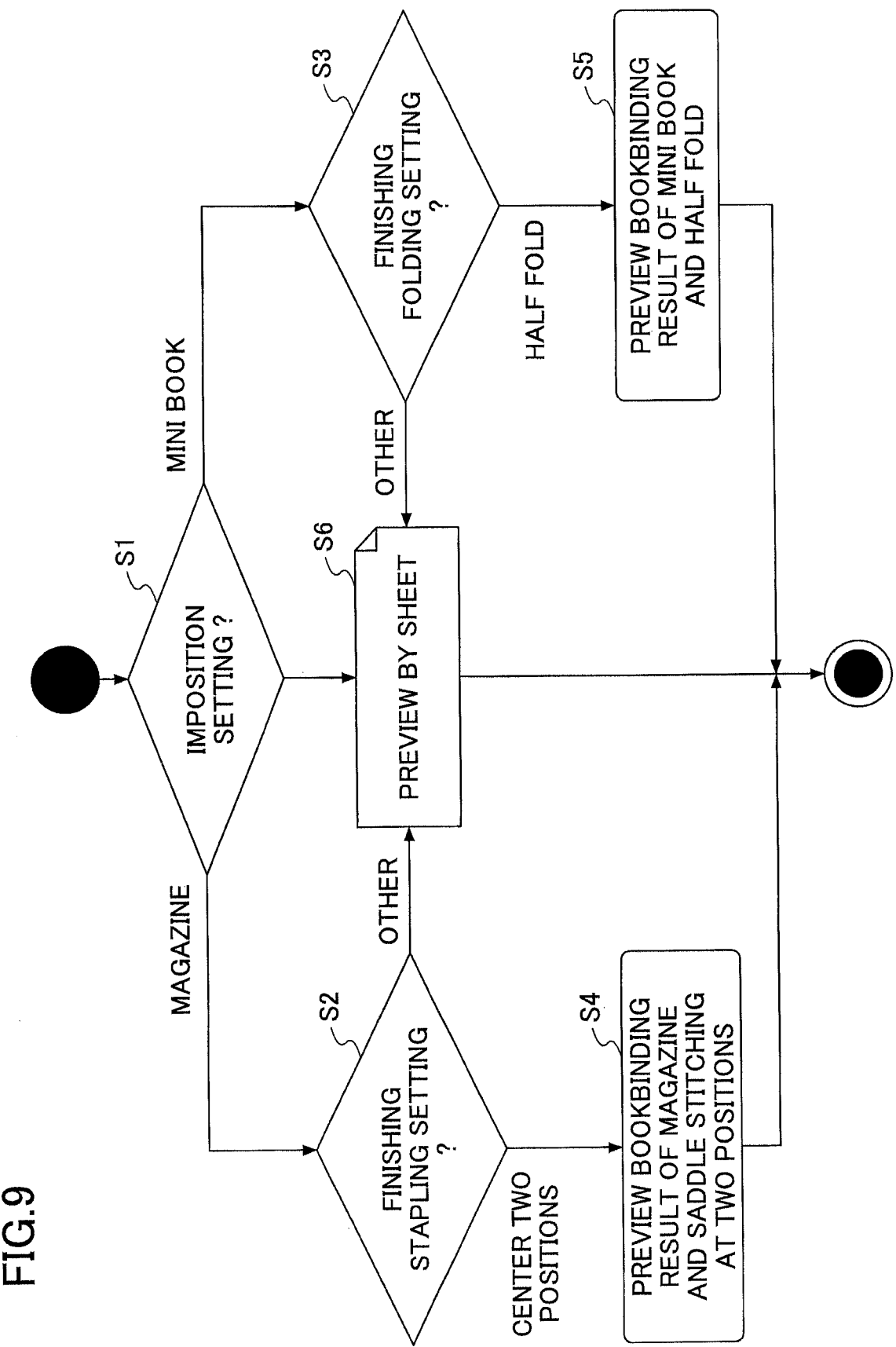
FIG. 9 is a flowchart of one example showing a procedure of preview display processing.

FIG. 9 is a flowchart of one example showing a procedure of preview display processing. In step S1, the prepress control part 34 determines the imposition type which is currently set. The imposition type that is set is, for example, one selected by the operator from the imposition type selection screen page such as that shown in FIGS. 4A and 4B.

When having determined in step S1 that the imposition type is "magazine", the prepress control part 34 determines the stapling setting in the finishing setting, in step S2. The stapling setting is, for example, one selected by the operator from the part for the stapling setting of the post process setting screen page shown in FIG. 6.

When having determined in step S2 that the stapling setting is "center two positions", the prepress control part 34 displays a preview image of a result of bookbinding for magazine and saddle stitching at center two positions, in step S4. When having determined in step S2 that the stapling setting is any one other than "center two positions", the prepress control part 34 displays a preview image by sheet (or in a sheet unit, before bookbinding), in step S6.

When having determined in step S1 that the imposition type is "mini book", the prepress control part 34 determines the folding setting in the finishing setting, in step S3. The folding setting is, for example, one selected by the operator from the part for the folding setting of the post process setting screen page shown in FIG. 7.

When having determined in step S3 that the folding setting is "half fold", the prepress control part 34 displays a preview image of a result of bookbinding for mini book and half fold, in step S5. When having determined in step S3 that the folding setting is any one other than "half fold", the prepress control part 34 displays a preview image by sheet (or in a sheet unit, before bookbinding), in step S6.

In the flowchart of FIG. 9, the stapling setting "center two positions" in step S2 and the folding setting "half fold" in step S3 are examples of a setting which is carried out for bookbinding. The flowchart of FIG. 9 supposes that in a case where the setting for bookbinding has been carried out (step S2 "center two positions" or step S3 "half fold"), it is convenient for the operator to see a preview image after bookbinding (step S4 or S5). Further, the flowchart of FIG. 9 supposes that in a case where no setting for bookbinding has been carried out (step S2 "other" or step S3 "other"), it is convenient for the operator to see a preview image before bookbinding (step S6).

Figure 10:
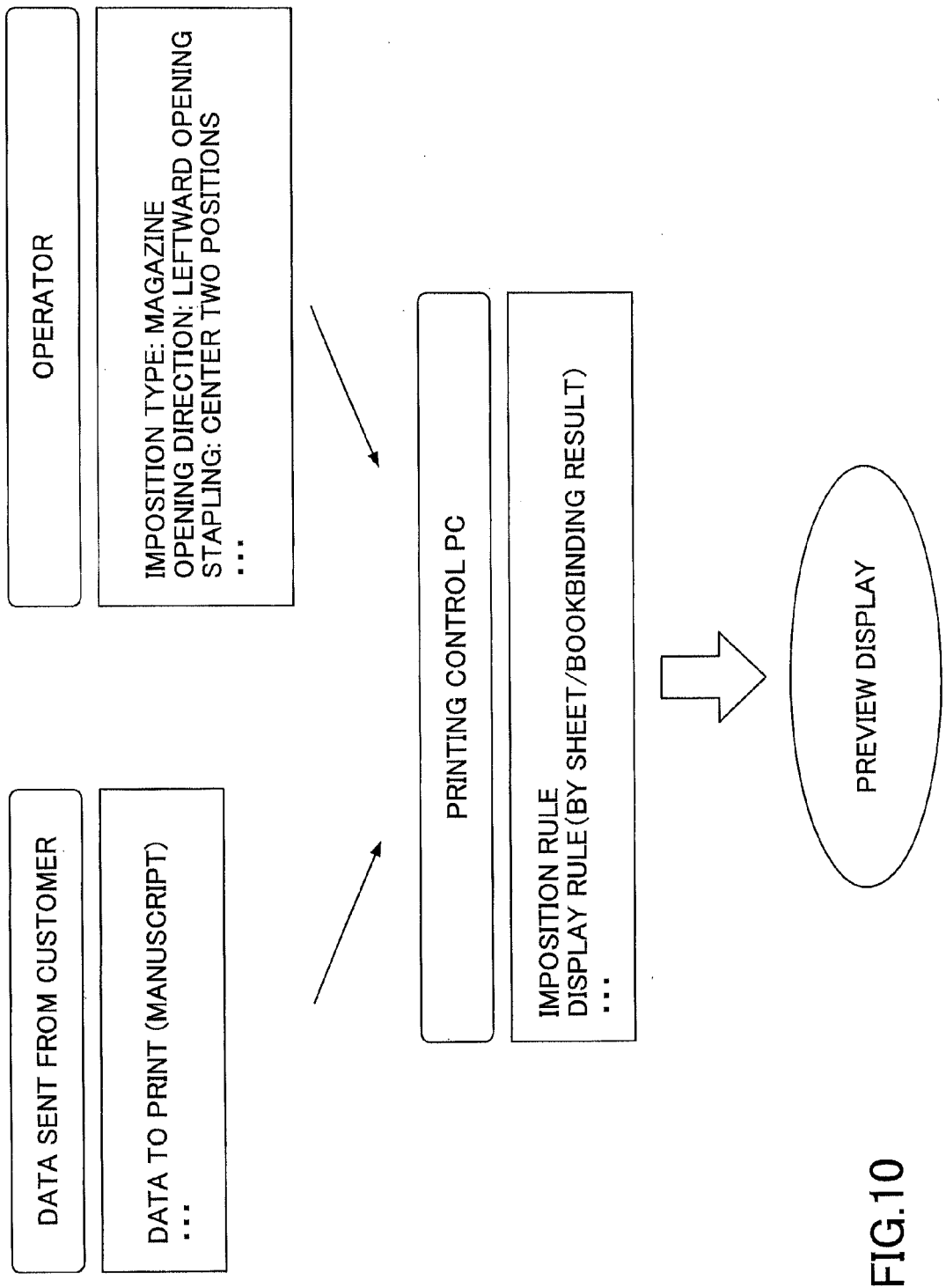
FIG. 10 shows an image of one example of the preview display processing.

FIG. 10 shows an image of one example of the preview display processing. As shown in FIG. 10, the printing control PC 12 generates a preview screen page (including a preview image) using the data sent from the customer (i.e., data (of a manuscript or the like) to be used for printing ("data to print (manuscript)" in FIG. 10)) and the contents of settings that are set by the operator (i.e., the imposition setting, the post process setting, and so forth ("imposition type", "opening direction", "stapling", . . . , in FIG. 10)), based on rules which the printing control PC 12 originally has (i.e., an imposition rule, a preview display rule ("display rule" in FIG. 10), and so forth)), and displays the generated preview screen page on the output unit 22 or the like.

Figure 11A:
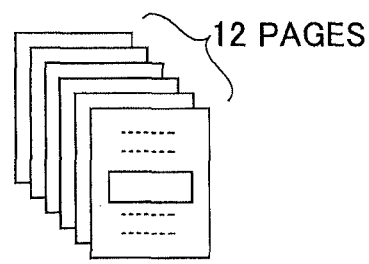
FIGS. 11A, 11B and 11C show images concerning one example of processing carried out before displaying a preview image.
Figure 11B:
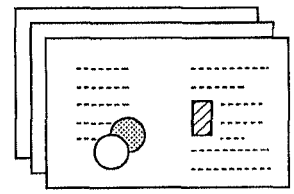
Figure 11C:
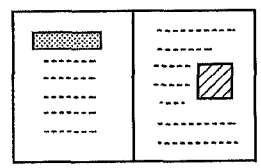

FIGS. 11A, 11B and 11C show images concerning one example of processing carried out before displaying a preview image. FIGS. 11A, 11B and 11C show an example in which the data sent from the customer includes 12 pages of a manuscript, the imposition type is "magazine" and the stapling setting is "center two positions".

FIG. 11A shows the data sent from the customer that includes 12 pages of the manuscript. Since the imposition type is "magazine", the printing control PC 12 carries out imposition by sheet for "magazine". Then, as shown in FIG. 11B, according to the imposition for "magazine", three sheets, for which, by using the 12 pages of the data sent from the customer, two pages are allocated to each of the front and back sides of each sheet ((2 pages on front side+2 pages on back side)×3 sheets=12 pages), are generated. Further, since the stapling setting is "center two positions", the printing control PC 12 generates a preview image of a bookbinding result after bookbinding is finished, as shown in FIG. 11C.

Figure 12A:
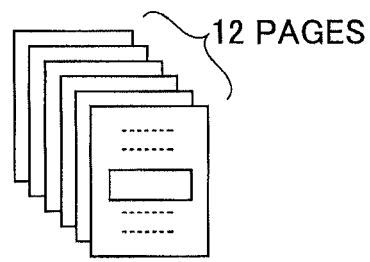
FIGS. 12A, 12B and 12C show images concerning another example of processing carried out before displaying a preview image.
Figure 12B:
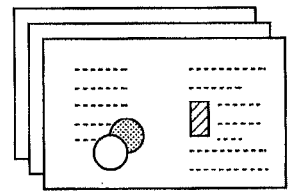
Figure 12C:
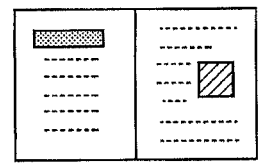

FIGS. 12A, 12B and 12C show images concerning another example of processing carried out before displaying a preview image. FIGS. 12A, 12B and 12C show an example in which the data sent from the customer includes 12 pages of a manuscript, the imposition type is "mini book" and the folding setting is "half fold".

FIG. 12A shows the data sent from the customer that includes 12 pages of the manuscript. Since the imposition type is "mini book", the printing control PC 12 carries out imposition by sheet for "mini book". Then, as shown in FIG. 12B, according to the imposition for "mini book", three sheets for which, by using the 12 pages of the data sent from the customer, two pages are allocated to each of the front and back sides of each sheet ((2 pages on front side+2 pages on back side)×3 sheets=12 pages), are generated. Further, since the folding setting is "half fold", the printing control PC 12 generates a preview image of a bookbinding result after bookbinding is finished, as shown in FIG. 12C.

<<Preview Image>>

Figure 13:
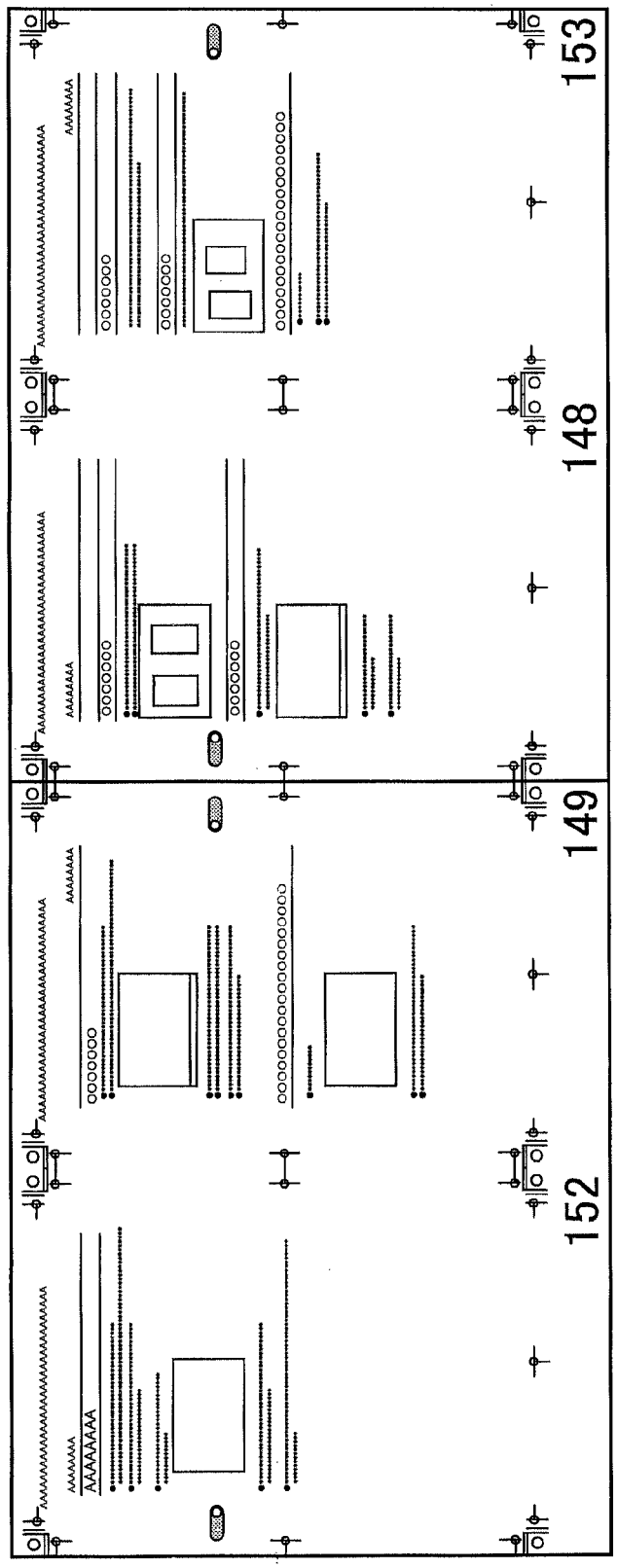
FIG. 13 shows an image of one example of a preview image for when an imposition type is "magazine" and a stapling setting is other than "center two positions"

FIG. 13 shows one example of a preview image for when the imposition type is "magazine" and the stapling setting is any one other than "center two positions". As shown in FIG. 13, in a case where the imposition type is magazine and the stapling setting is any one other than center two positions, the preview image shows a state in which two sheets of paper (before bookbinding, i.e., before being folded) are arranged, side by side. In the preview image of FIG. 13, the left half of FIG. 13 shows the back side of the sheet of paper and the right half of FIG. 13 shows the front side of the subsequent sheet of paper. It is noted that the numbers "152", "149", "148" and "153" shown in FIG. 13 are page numbers printed on the respective pages.

Figure 14:
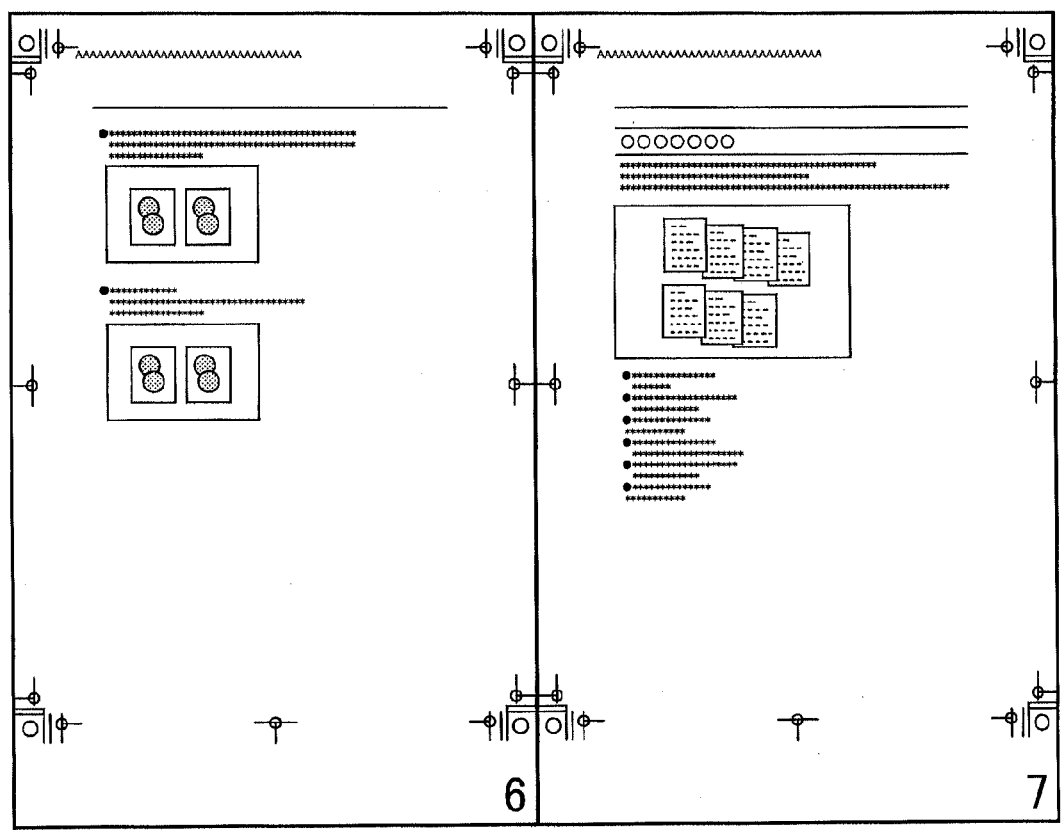
FIG. 14 shows an image of one example of a preview image for when the imposition type is "magazine" and the stapling setting is "center two positions"

FIG. 14 shows one example of a preview image for when the imposition type is "magazine" and the stapling setting is "center two positions". As shown in FIG. 14, in a case where the imposition type is magazine and the stapling setting is center two positions, the preview image shows a state in which a magazine is opened and two facing pages in the magazine can be seen at the same time (i.e., a bookbinding result of the settings "magazine and stapling at center two positions" is opened and two facing pages can be seen at the same time). It is noted that the numbers "6" and "7" shown in FIG. 14 are page numbers printed on the respective pages.

Figure 15:
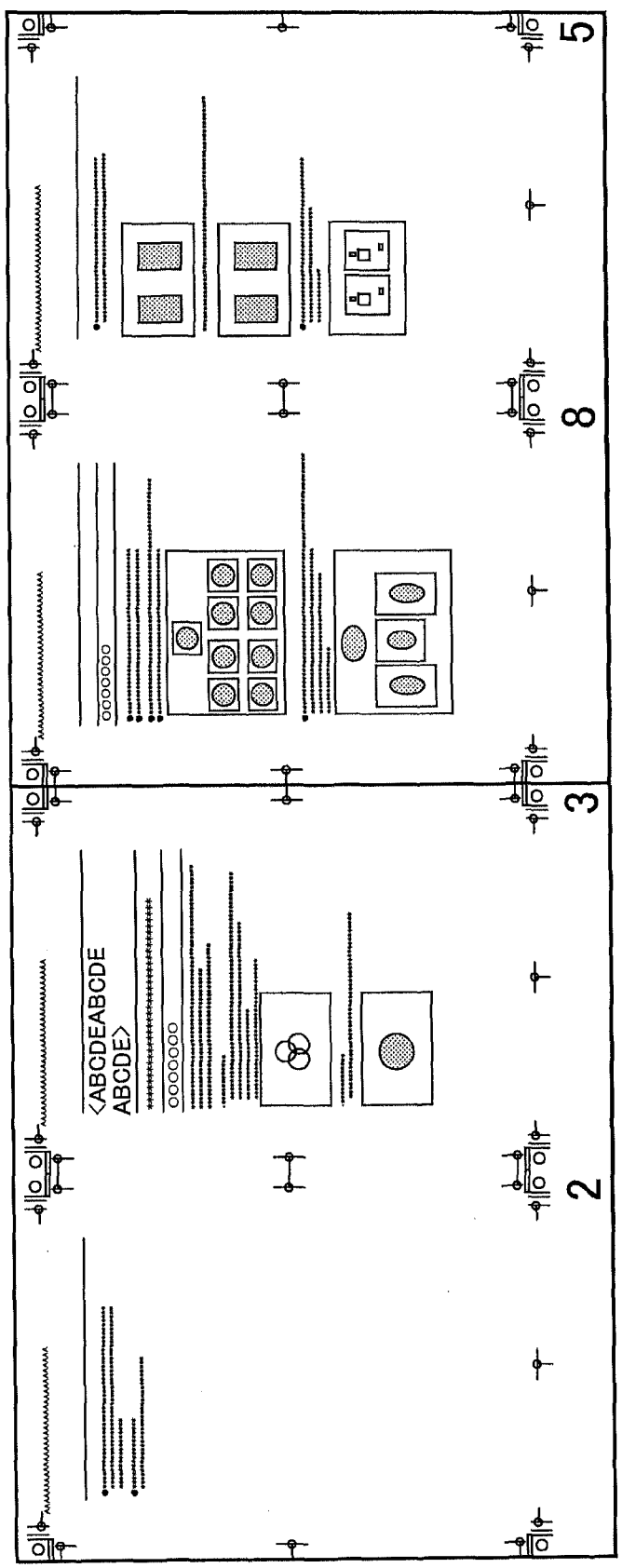
FIG. 15 shows an image of one example of a preview image for when the imposition type is "mini book" and a folding setting is other than "half fold"

FIG. 15 shows one example of a preview image for when the imposition type is "mini book" and the folding setting is any one other than "half fold". As shown in FIG. 15, in a case where the imposition type is mini book and the folding setting is any one other than half fold, the preview image shows a state in which two sheets of paper (before bookbinding) are arranged, side by side. In the preview image of FIG. 15, the left half shows the back side of a sheet of paper and the right half shows the front side of the subsequent sheet of paper. It is noted that the numbers "2", "3", "8" and "5" shown in FIG. 15 are page numbers printed on the respective pages.

Figure 16:
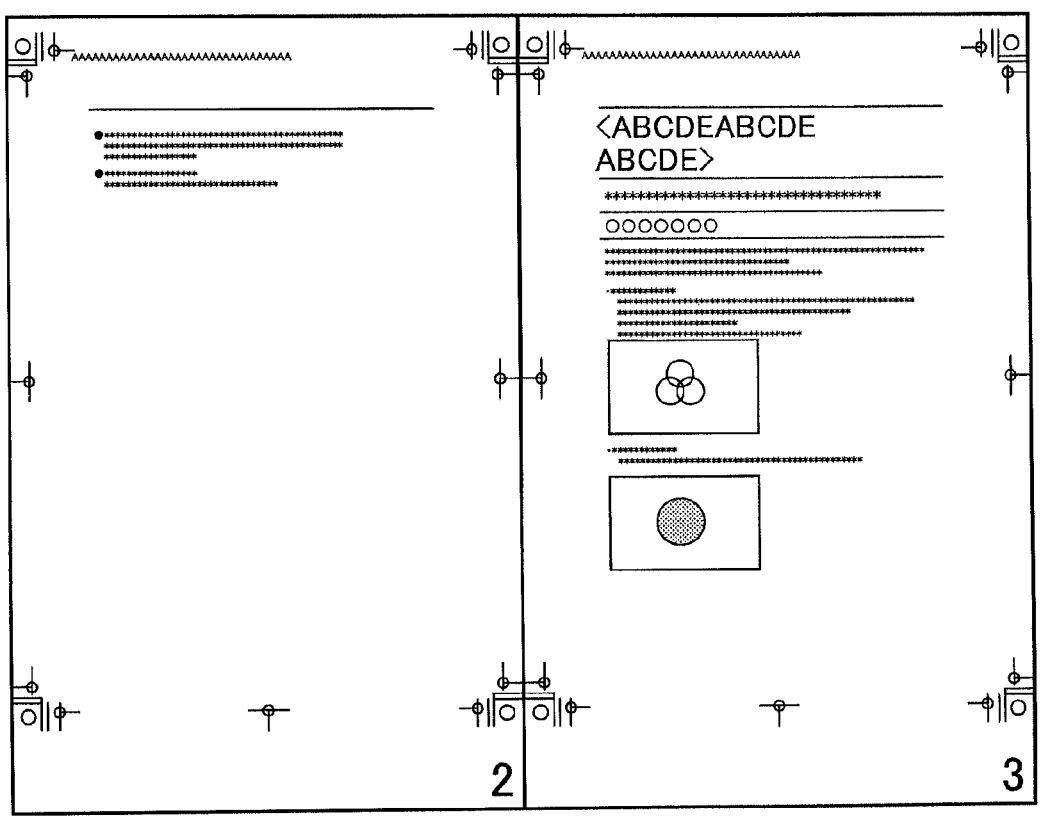
FIG. 16 shows an image of one example of a preview image for when the imposition type is "mini book" and the folding setting is "half fold"
Figure 17:
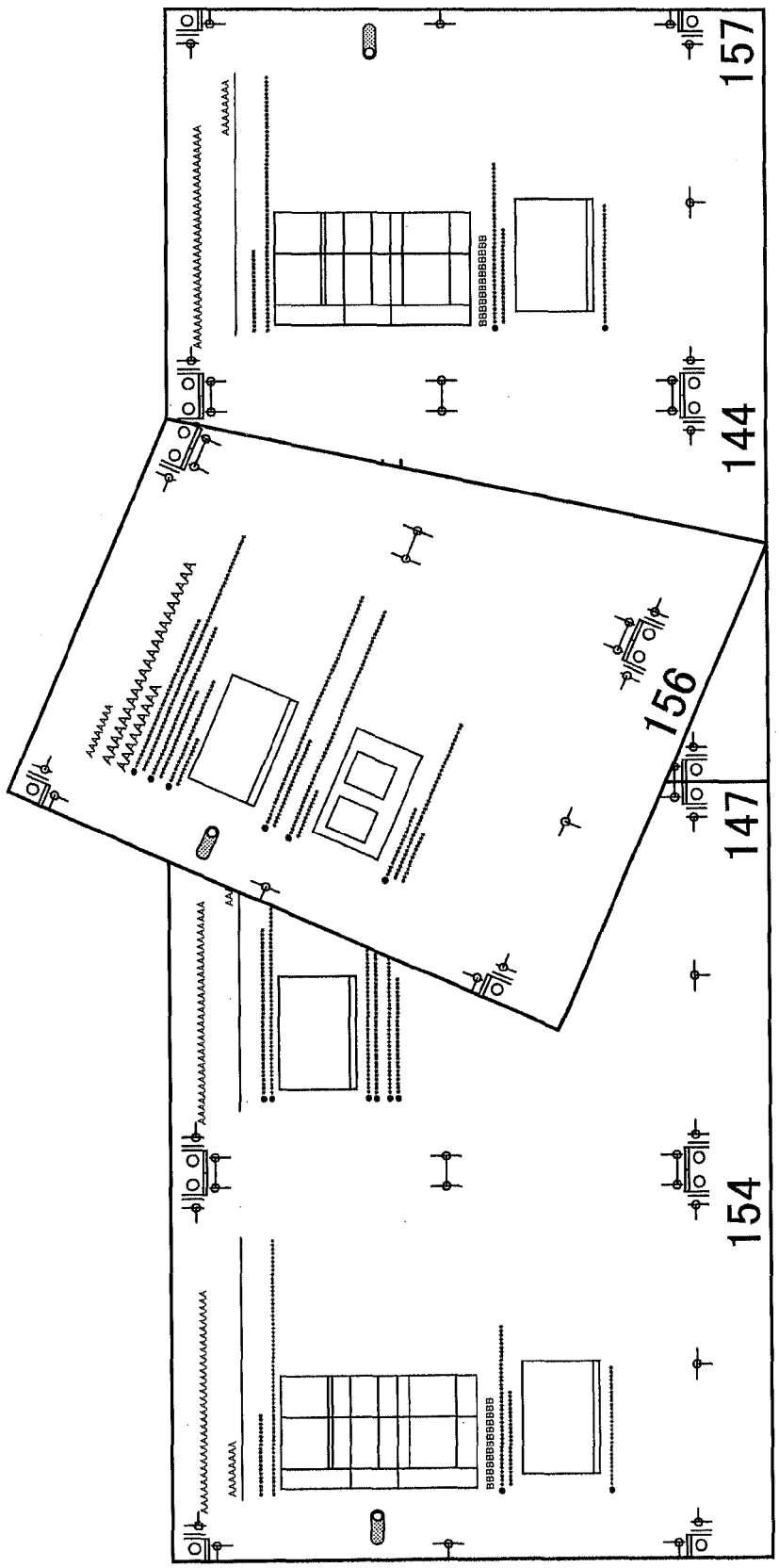
FIG. 17 shows an image of one example of turning a page in a preview image.

FIG. 16 shows one example of a preview image for when the imposition type is "mini book" and the folding setting is "half fold". As shown in FIG. 16, in a case where the imposition type is mini book and the folding setting is half fold, the preview image shows a state in which a mini book is opened and two facing pages in the mini book can be seen at the same time (i.e., a bookbinding result of the settings "mini book and half fold" is opened and two facing pages can be seen at the same time). It is noted that the numbers "2" and "3" shown in FIG. 17 are page numbers printed on the respective pages.

It is noted that as mentioned above, as shown in FIG. 17, it is possible to display a preview image of the preceding or subsequent page, from the preview images shown in FIGS. 13 through 16, as if the preceding or subsequent page appears as a result of the current page being turned, in response to the operator carrying out an operation of, for example, dragging by using the mouse or the like. FIG. 17 shows an image of one example of turning a page in a preview image. Such an operation of turning a page in a preview image can be realized by using known techniques.

For example, in AIR (Adobe Integrated Runtime) (registered trademark) provided by Adobe Systems Incorporated, there is an application for turning a Web page as if turning a page of a book. This application reads a Web site written in HTML, and displays an image including an expression having a motion by using Flash.

<<Details of Preview Display Processing>>

Figure 18:
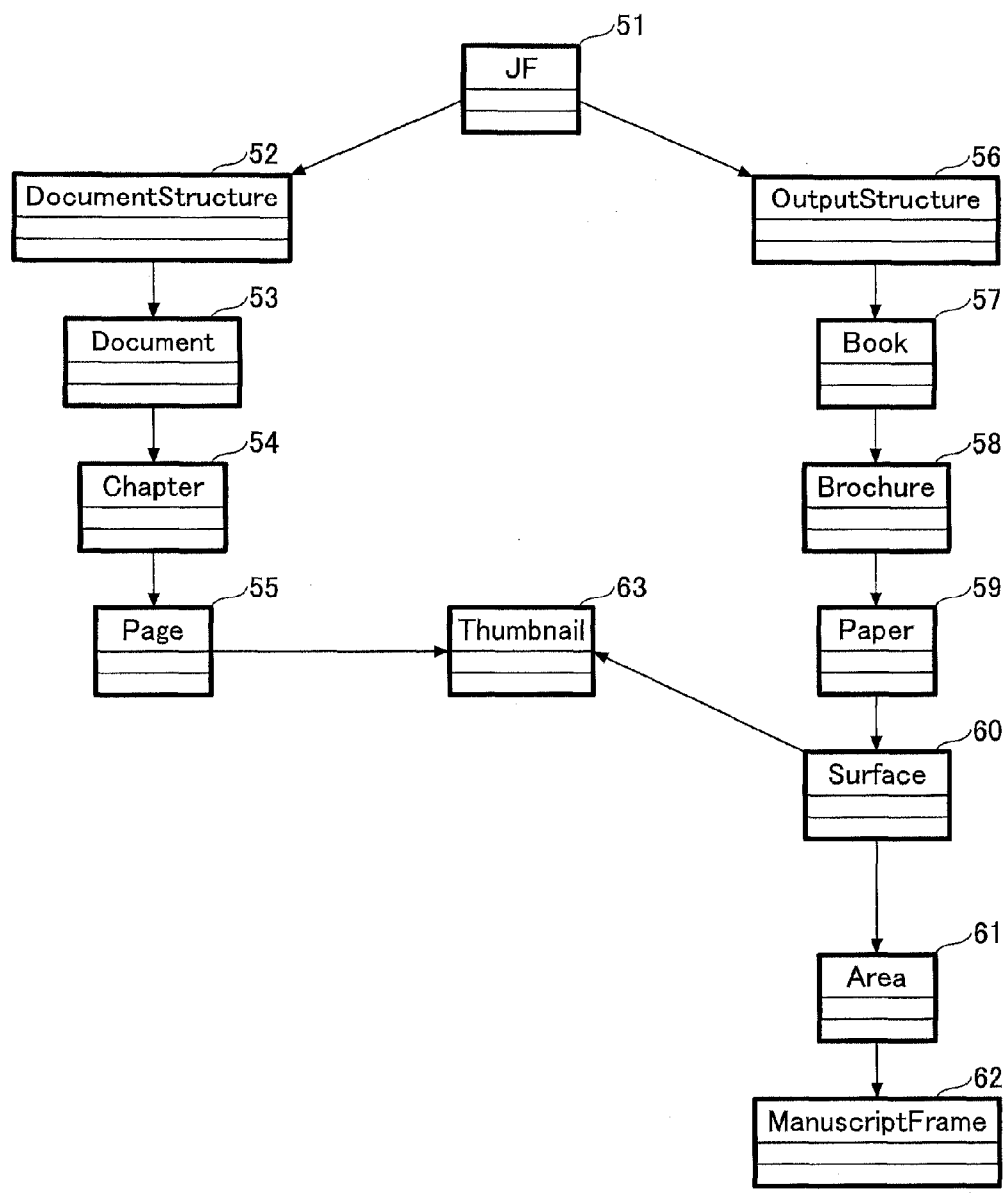
FIG. 18 shows a data configuration of one example of a job format.

Below, using a case where the imposition type is "magazine" and the stapling setting is "center two positions" as an example, details of preview display processing will be described. It is noted that the printing control PC 12 treats a job format (JF) such as that shown in FIG. 18. FIG. 18 shows a data configuration of one example of a job format.

The JF 51 shown in FIG. 18 is a JDF in a unique type, for example. The JF has an obligation of holding document structure data 52 and output structure data 56. Further, it is possible to generate data for displaying and data for printing as a result of causing the document structure data 52 and the output structure data 56 to cooperate together.

The document structure data 52 includes document data 53, chapter data 54 and page data 55. Relationship between the document data 53, the chapter data 54 and the page data 55 is solved, and a structure as a document is expressed. The output structure data 56 includes book data 57, brochure data 58, paper data 59, surface data 60, area data 61 and manuscript frame data 62. Relationship between the book data 57, the brochure data 58, the paper data 59, the surface data 60, the area data 61 and the manuscript frame data 62 is solved, and a structure to output (i.e., a book) is expressed.

The document data 53 is a root element of the document, and includes plural chapters. Respective items of the chapter data 54 are elements that form the document, and each item of the chapter data 54 includes plural pages. Respective items of the page data 55 are elements that form each chapter, each item of the page data corresponds to a manuscript page (for example, a PDF page) in one-to-one basis, and the page data 55 solves mapping with the manuscript pages.

The book data 57 is a root element of the output (i.e., the book), and includes plural brochures. Respective items of the brochure data 58 are elements that form the book, and each item of the brochure data 58 includes plural sheets of paper. Respective items of the paper data 59 are elements that form each brochure, and each item of the paper data 59 includes plural surfaces. Respective items of the surface data 60 are elements that form each sheet of paper, and each item of the surface data 60 includes plural areas. Each item of the surface data 60 expresses a physical surface, and is either a front surface (a front side) or a back surface (a back side).

Further, respective items of the area data 61 are elements that form each surface, and each item of the area data 61 includes plural manuscript frames. Each item of the area data 61 expresses a repeat of a set of the manuscript frames for the same surface. Respective items of the manuscript frame data 62 are elements that form each area. The contents of each item of the page data 55 of the document structure data 52 are allocated to a corresponding item of the manuscript frame data 62, and thus, data for displaying or printing is generated.

It is noted that the page data 55 includes thumbnail data 63 to be used for displaying a "page order/structure editing" screen page for manuscript pages, and a "manuscript page editing" screen page, for example. Further, the surface data 60 includes thumbnail data 63 to be used for displaying a "paper/imposition/post process" screen page, and an "output method/setting" screen page.

Figure 19:
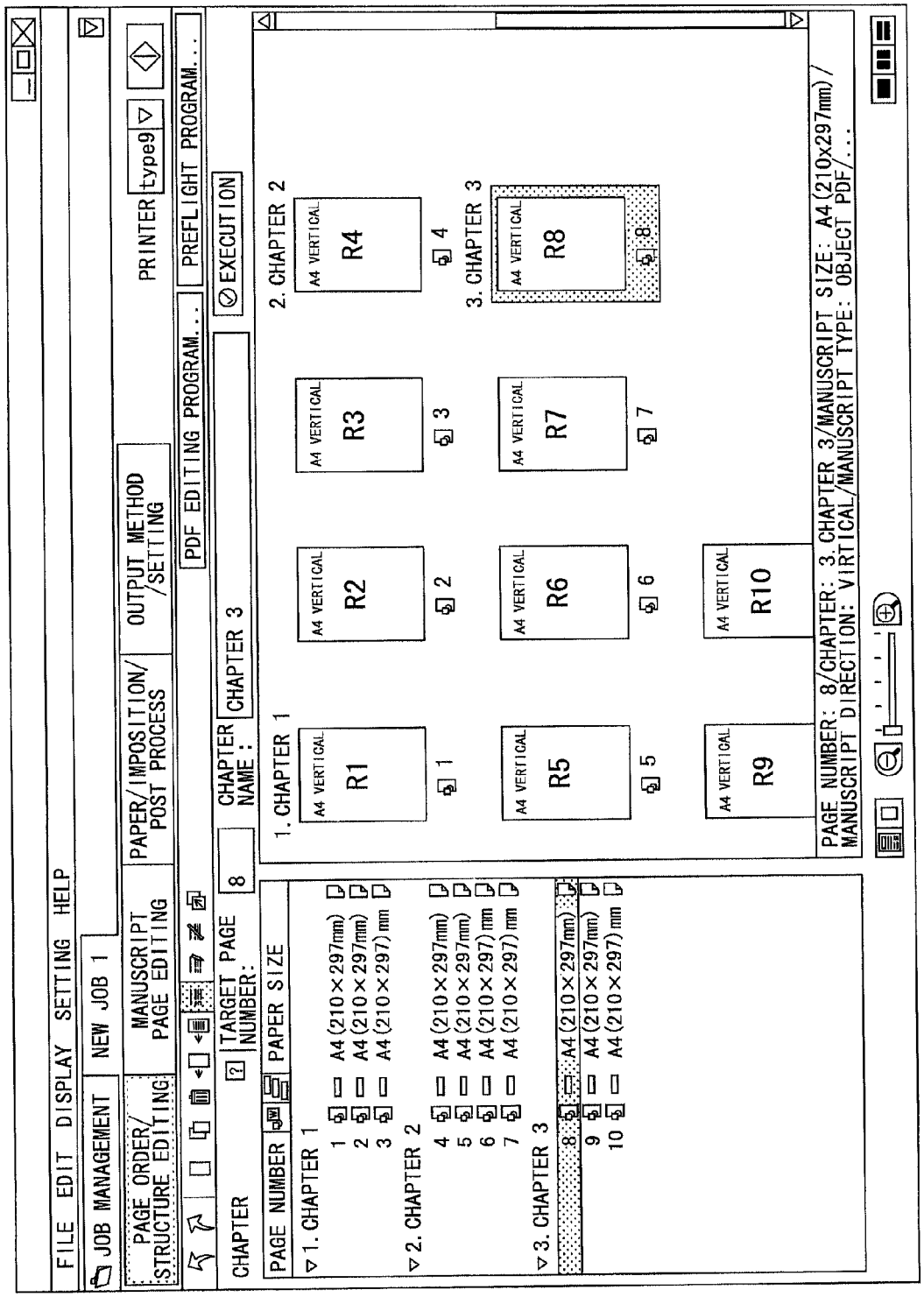
FIG. 19 shows an image of one example of a "page order/structure editing" screen page for manuscript pages.

FIG. 19 shows an image of one example of the "page order/structure editing" screen page for manuscript pages. By using the chapter data 54, the page data 55 and the thumbnail data 63 of the document structure data 52, the "page order/structure editing" screen page for manuscript pages shown in FIG. 19 can be displayed.

Figure 20:
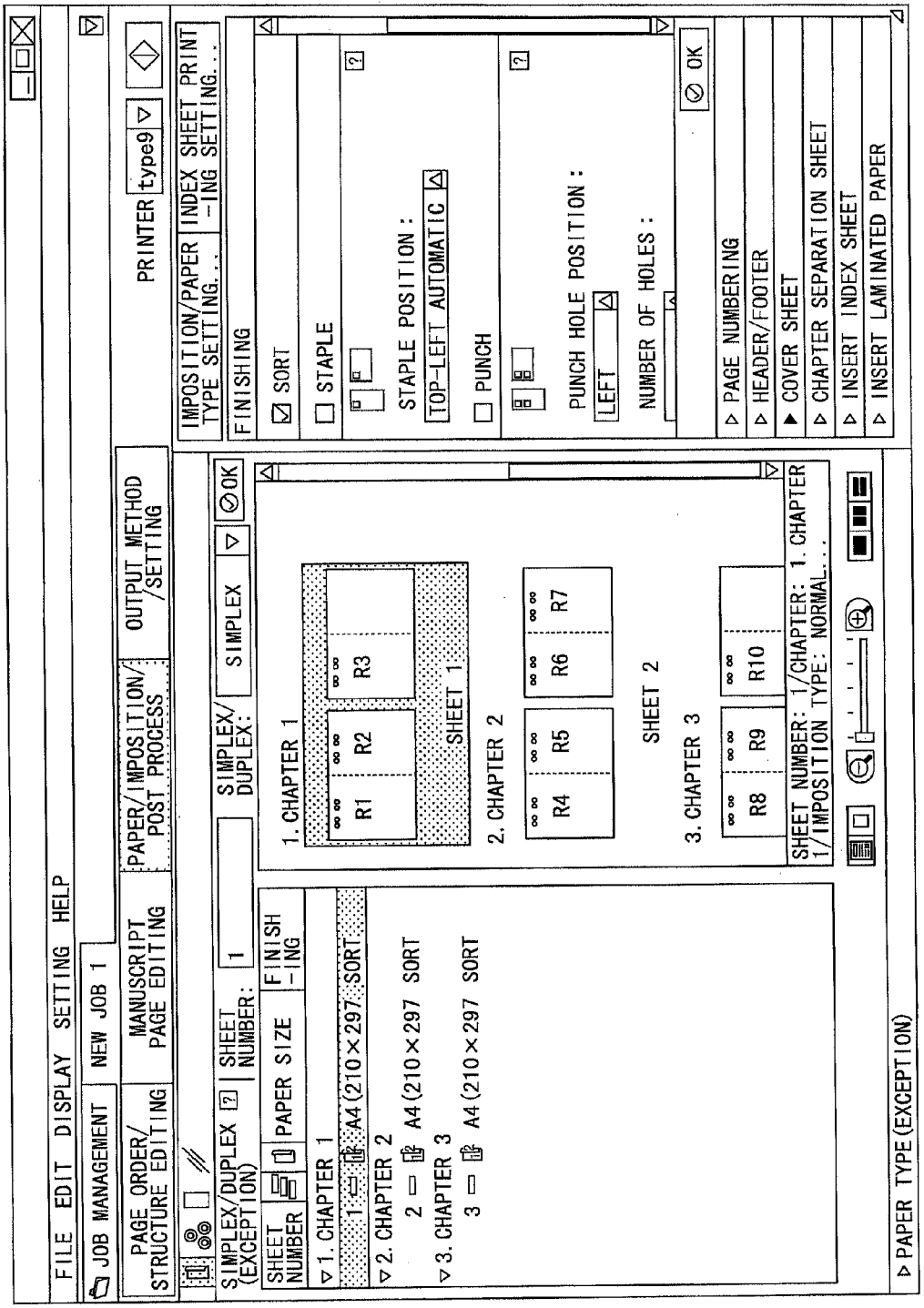
FIG. 20 shows an image of one example of a "paper/imposition/post process" screen page.

FIG. 20 shows an image of one example of the "paper/imposition/post process" screen page. By using the brochure data 58, the paper data 59, the surface data 60, the area data 61, the manuscript frame data 62 and the thumbnail data 63 of the output structure data 56, the "paper/imposition/post process" screen page shown in FIG. 20 can be displayed. It is noted that the "paper/imposition/post process" screen page shown in FIG. 20 is an example for when the number of N-up "2" and duplex have been set as imposition conditions.

Figure 21:
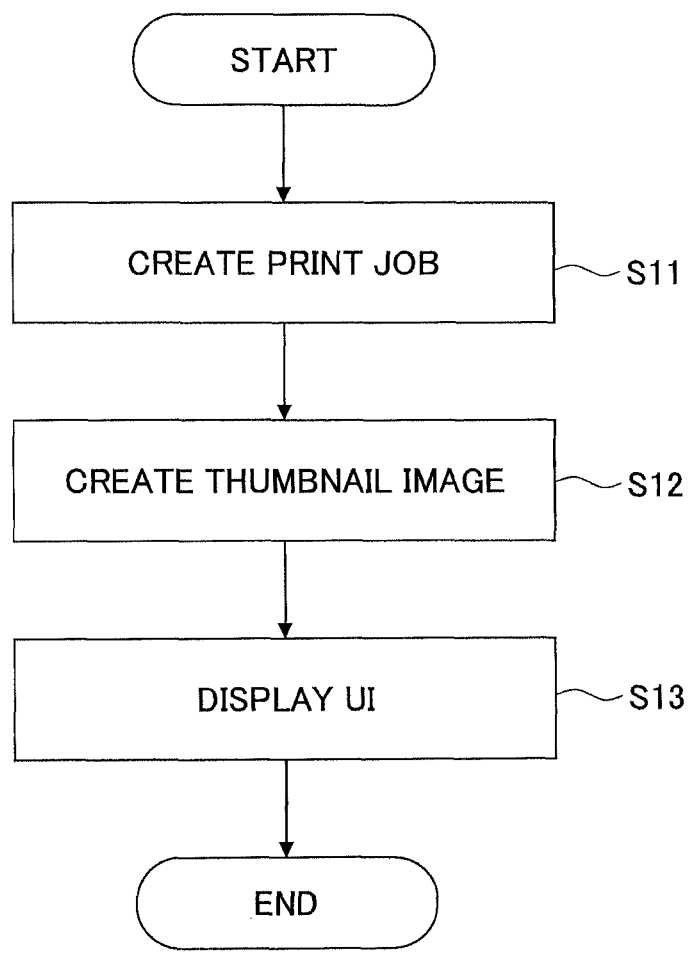
FIG. 21 is a flowchart of one example of processing to display a UI including preview images.

FIG. 21 is a flowchart of one example of processing to display a UI including preview images. In step S11, the job control part 31 generates job data from the data sent from the customer. Further, the prepress control part 34 creates JDF for printing from the job data according to imposition setting information indicating that the imposition type is "magazine" and the stapling setting is "center two positions". That is, in step S11, the print job is created according to the manuscript structure and the imposition setting. It is noted that the details of the processing in step S11 will be described later.

Next, in step S12, the prepress control part 34 responds to, for example, a request for displaying a UI such as the "paper/imposition/post process" screen page shown in FIG. 20, to create thumbnail images necessary for displaying preview images of a bookbinding result. It is noted that the prepress control part 34 creates thumbnail images necessary for displaying preview images by sheet (i.e., before bookbinding) in any case other than the case where "the imposition type is magazine and the stapling setting is center two positions". It is noted that the details of the processing of step S12 will be described later.

In step S13, the prepress control part 34 uses the created thumbnail images to display the "paper/imposition/post process" screen page shown in FIG. 20 including, for example, the preview images of the bookbinding result. It is noted that the details of the processing of step S13 will be described later.

Figure 22:
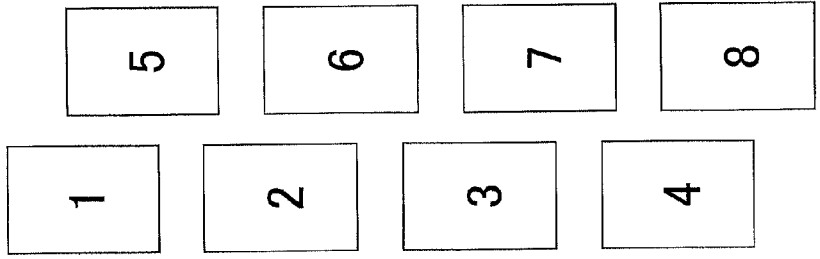
FIGS. 22A, 22B and 22C show an image of one example of processing in step S11 of FIG. 21.
Figure 23:
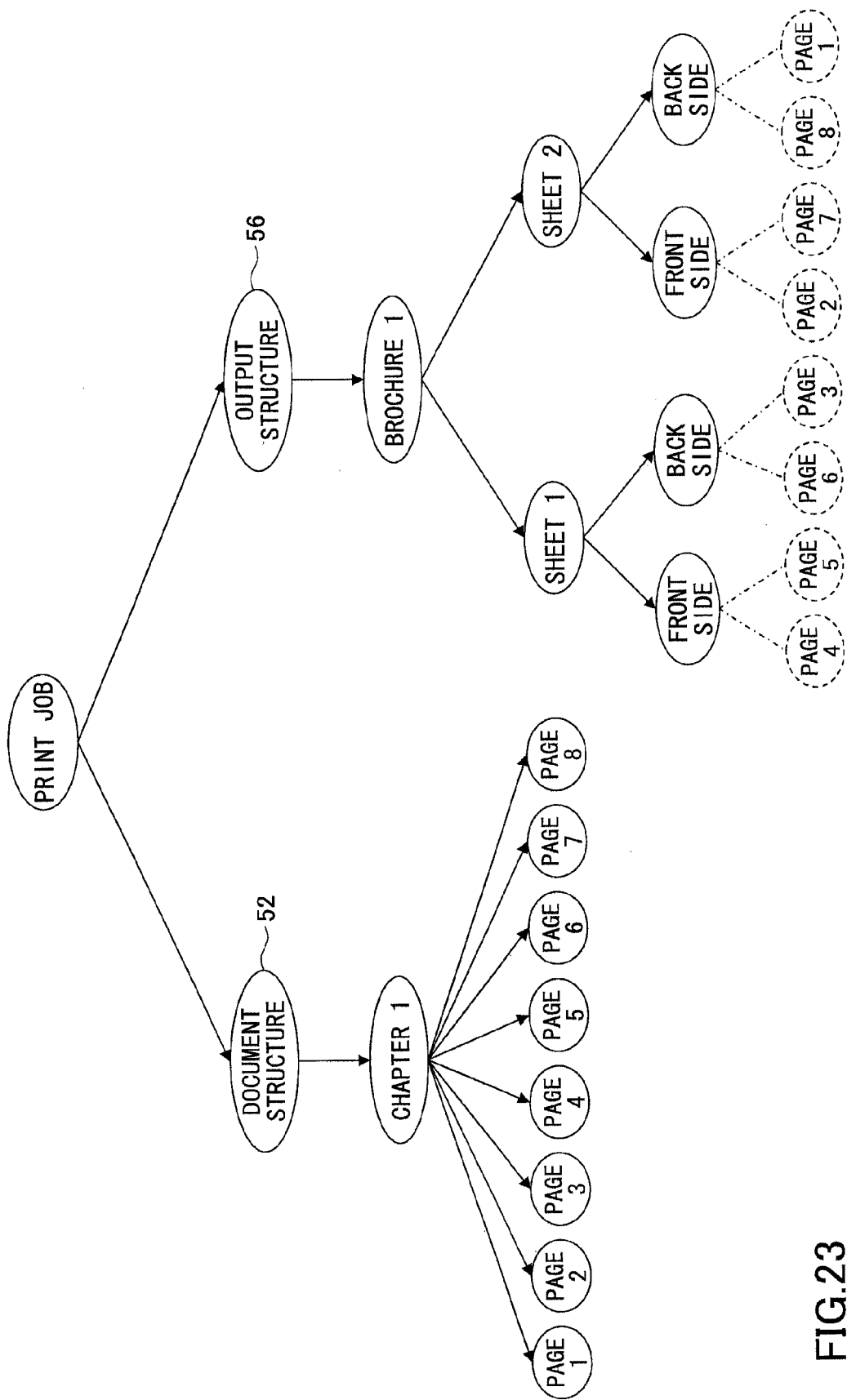
FIG. 23 shows a configuration of one example of a print job.

FIGS. 22A, 22B and 22C show an image of one example of processing step S11 of FIG. 21. FIG. 23 shows a configuration of one example of the print job. The job control part 31 creates the document structure data 52 such as that shown in FIG. 22A and shown at the left side in FIG. 23 using the data sent from the customer (i.e., manuscript). The document structure data 52 of FIG. 23 indicates that the manuscript (as the data sent from the customer) includes one chapter, and the chapter includes 8 pages of a manuscript.

According to the imposition setting indicating that the imposition type is "magazine" and the stapling setting is "center two positions" shown in FIG. 22B, the prepress control part 34 creates the output structure data 56 shown in FIG. 22C and shown at the right side in FIG. 23 from the document structure data 52 shown in FIG. 22A and shown at the left side in FIG. 23. The output structure data 56 shown at the right side in FIG. 23 indicates that the output (book) includes one brochure, "page 4" and "page 5" of the manuscript are allocated to the front side of the first sheet of paper; "page 6" and "page 3" of the manuscript are allocated to the back side of the first sheet of paper; "page 2" and "page 7" of the manuscript are allocated to the front side of the second sheet of paper; and "page 8" and "page 1" of the manuscript are allocated to the back side of the second sheet of paper.

FIGS. 24A and 24B show an image of processing in step S12 of FIG. 21. The prepress control part 34 responds to, for example, the request for displaying the UI such as the "paper/imposition/post process" screen page shown in FIG. 20, to create the thumbnail images necessary for displaying the preview images of the bookbinding result. For example, the prepress control part 34 creates the thumbnail images shown in FIG. 24B necessary for displaying the preview images of the bookbinding result of "magazine" from the output structure data 56 shown in FIG. 24A. It is noted that the prepress control part 34 may create the thumbnail images shown in FIG. 24B as a result of creating preview images of respective surfaces (sides), such as those shown in FIG. 22C, and then, dividing each of the thus-created preview images of respective surfaces into thumbnail images of the respective pages such as those shown in FIG. 24B.

FIGS. 25A and 25B show an image of processing in step S13 of FIG. 21. By using the thumbnail images shown in FIG. 25A, the prepress control part 34 can display the preview images of the bookbinding result of "magazine" shown in FIG. 25B. It is noted that when displaying the preview images of the bookbinding result of "magazine" shown in FIG. 25B, it is possible to improve the processing speed as a result of the prepress control part 34 reading, one by one, in sequence, the thumbnail images of the pages to be used for the displaying. It is noted that as mentioned above, as shown in FIG. 25B, it is possible to display a preview image of the preceding or subsequent page, as if the preceding or subsequent page appears as a result of the current page being turned, in response to the operator carrying out an operation of, for example, dragging by using the mouse or the like. Specifically, in FIG. 25B, the top image shows a state in which page 1 (first page) of the book (the bookbinding result) appears. Then, for example, by turning page 1, pages 2 and 3 appear, as shown in the second image from the top. Then, by turning page 3, pages 4 and 5 appear, as shown in the third image from the top. Then, by turning page 5, pages 6 and 7 appear, as shown in the fourth image from the top. Then, by turning page 7, page 8 (last page) appears, as shown in the bottom image.

The reverse operations of tuning the pages, in sequence, can also be carried out in the same way.

SUMMARY OF EMBODIMENT

According to the above-described embodiment of the present invention, in response to the preview display request, it is possible to display a preview image of a bookbinding result when the setting for imposition type is "magazine" and the stapling setting is "center two positions" or the setting for imposition type is "mini book" and the folding setting is "half fold", and display a preview image by sheet (before bookbinding) in any other case.

In other words, according to the embodiment of the present invention, the contents of the imposition setting and the finishing setting are determined, and when the imposition setting is "magazine" and the stapling setting is center stapling or the imposition setting is "mini book" and the folding setting is half fold, a preview image considering the folding (bookbinding result) can be automatically displayed.

It is noted that a part configured to determine setting information for imposition type corresponds to the processing in step S1 of FIG. 9; a part configured to determine setting information for finishing corresponds to the processing in step S2 or S3 of FIG. 9; and a part configured to display a preview image corresponds to the processing in step S4, S5 or S6 of FIG. 9. Further, a preview display program corresponds to the printing control program 30, and a preview display apparatus corresponds to the printing control PC 12.

The present invention is not limited to the specifically disclosed embodiments, and variations and modifications may be made without departing from the scope of the present invention.

The present Patent Application is based on Japanese Priority Patent Application No. 2011-020220, filed Feb. 1, 2011, and Japanese Priority Patent Application No. 2012-002572, filed Jan. 10, 2012, the entire contents of which are hereby incorporated herein by reference.

What is claimed is:

1. A non-transitory computer readable medium storing a preview display program for controlling a computer system to, when executed by one or more processors of the computer system, implement a preview display method, the method comprising:

receiving, using the one or more processors, print data, imposition setting information, and finishing setting information;

determining, using the one or more processors, an imposition type based on the received imposition setting information;

determining, using the one or more processors, a finishing type based on the received finishing setting information;

generating, using the one or more processors, a job format file based on the received print data, determined imposition type, and received finishing type, the job format file including document structure data, output structure data, and thumbnail data, generating, using the one or more processors, a first preview image and a second preview image based on the job format file, the first preview image being an image of printed output pages of the job format file before bookbinding, and the second preview image being an image of the printed output pages of the job format file after bookbinding based on the determined imposition type, determined finishing type, and the thumbnail data;

selecting, using the one or more processors, a preview image for display from either the first or second preview images based on the determined imposition type and the determined finishing type, the selected preview image being the second preview image when the determined imposition type is either a setting of magazine or mini book, and the determined finishing type is a setting for carrying out the bookbinding; and displaying, on a display panel, the selected preview image.

2. The non-transitory computer readable medium as claimed in claim 1, wherein the setting for carrying out the bookbinding included in the setting information for finishing includes saddle stitching when the setting for imposition type is magazine and includes half fold when the setting for imposition type is mini book.

3. The non-transitory computer readable medium as claimed in claim 2, wherein when magazine is set as the imposition type, plural sheets of paper are superposed together, and the plural sheets of paper in the superposed state are folded in a lump while the superposed state is kept to form a book having a form of a magazine, and when mini book is set as the imposition type, plural sheets of paper are folded separately, and the plural sheets of separately folded paper are superposed together while the folded states of the respective sheets of paper are kept, to form a book having a form of a mini book.

4. The non-transitory computer readable medium as claimed in claim 3, wherein the displaying includes displaying the preview image for the state before the bookbinding in a state of arranging a back side of a sheet and a front side of a subsequent sheet, side by side.

5. The non-transitory computer readable information recording medium as claimed in claim 4, wherein the displaying includes displaying a state of turning a page by using a moving picture showing the state of turning the page.

6. The non-transitory computer readable medium as claimed in claim 3, wherein the displaying includes displaying a state of turning a page by using a moving picture showing the state of turning the page.

7. The non-transitory computer readable medium as claimed in claim 2, wherein the displaying includes displaying the preview image for the state before the bookbinding in a state of arranging a back side of a sheet and a front side of a subsequent sheet, side by side.

8. The non-transitory computer readable information recording medium as claimed in claim 7, wherein the displaying includes displaying a state of turning a page by using a moving picture showing the state of turning the page.

9. The non-transitory computer readable medium as claimed in claim 2, wherein the displaying includes displaying a state of turning a page by using a moving picture showing the state of turning the page.

10. The non-transitory computer readable medium as claimed in claim 1, wherein when magazine is set as the imposition type, plural sheets of paper are superposed together, and the plural sheets of paper in the superposed state are folded in a lump while the superposed state is kept to form a book having a form of a magazine, and when mini book is set as the imposition type, plural sheets of paper are folded separately, and the plural sheets of separately folded paper are superposed together while the folded states of the respective sheets of paper are kept, to form a book having a form of a mini book.

11. The non-transitory computer readable medium as claimed in claim 10, wherein the displaying includes displaying the preview image for the state before the bookbinding in a state of arranging a back side of a sheet and a front side of a subsequent sheet, side by side.

12. The non-transitory computer readable information recording medium as claimed in claim 11, wherein the displaying includes displaying a state of turning a page by using a moving picture showing the state of turning the page.

13. The non-transitory computer readable medium as claimed in claim 10, wherein the displaying includes displaying a state of turning a page by using a moving picture showing the state of turning the page.

14. The non-transitory computer readable medium as claimed in claim 1, wherein the displaying includes displaying the preview image for the state before the bookbinding in a state of arranging a back side of a sheet and a front side of a subsequent sheet, side by side.

15. The non-transitory computer readable information medium as claimed in claim 14, wherein the displaying includes displaying a state of turning a page by using a moving picture showing the state of turning the page.

16. The non-transitory computer readable medium as claimed in claim 1, wherein the displaying includes displaying a state of turning a page by using a moving picture showing the state of turning the page.

17. A preview display apparatus comprising:

a memory having computer readable instructions stored thereon; and at least one processor configured to execute the computer readable instructions to, receive print data, imposition setting information, and finishing setting information;

determine an imposition type based on the received imposition setting information;

determine a finishing type based on the received finishing setting information;

generate a job format file based on the received print data, determined imposition type, and received finishing type, the job format file including document structure data, output structure data, and thumbnail data, generate a first preview image and a second preview image based on the job format file, the first preview image being an image of printed output pages of the job format file before bookbinding, and the second preview image being an image of the printed output pages of the job format file after bookbinding based on the determined imposition type, determined finishing type, and the thumbnail data;

select a preview image for display from either the first or second preview images based on the determined imposition type and the determined finishing type, the selected preview image being the second preview image when the determined imposition type is either a setting of magazine or mini book, and the determined finishing type is a setting for carrying out the bookbinding; and display, on a display panel, the selected preview image.

18. A method, performed by one or more processors, the method comprising:

receiving, using the one or more processors, print data, imposition setting information, and finishing setting information;

determining, using the one or more processors, an imposition type based on the received imposition setting information;

determining, using the one or more processors, a finishing type based on the received finishing setting information;

generating, using the one or more processors, a job format file based on the received print data, determined imposition type, and received finishing type, the job format file including document structure data, output structure data, and thumbnail data, generating, using the one or more processors, a first preview image and a second preview image based on the job format file, the first preview image being an image of printed output pages of the job format file before bookbinding, and the second preview image being an image of the printed output pages of the job format file after bookbinding based on the determined imposition type, determined finishing type, and the thumbnail data;

selecting, using the one or more processors, a preview image for display from either the first or second preview images based on the determined imposition type and the determined finishing type, the selected preview image being the second preview image when the determined imposition type is either a setting of magazine or mini book, and the determined finishing type is a setting for carrying out the bookbinding; and displaying, on a display panel, the selected preview image.

* * * * *